(12) United States Patent
Des Champs

(10) Patent No.: US 11,231,203 B1
(45) Date of Patent: Jan. 25, 2022

(54) SYSTEMS, DEVICES, AND/OR METHODS FOR MANAGING CONDENSATE

(71) Applicant: Nicholas H. Des Champs, Fincastle, VA (US)

(72) Inventor: Nicholas H. Des Champs, Fincastle, VA (US)

(*) Notice: Subject to any disclaimer, the term of this patent is extended or adjusted under 35 U.S.C. 154(b) by 32 days.

(21) Appl. No.: 17/182,298

(22) Filed: Feb. 23, 2021

(51) Int. Cl.
*F16K 24/04* (2006.01)
*F24F 13/22* (2006.01)
(Continued)

(52) U.S. Cl.
CPC .......... *F24F 13/22* (2013.01); *F16K 24/042* (2013.01); *F16T 1/20* (2013.01); *F16T 1/32* (2013.01); *F16T 1/38* (2013.01); *F16T 1/383* (2013.01); *F16T 1/02* (2013.01); *F24F 2013/227* (2013.01); *Y10T 137/7485* (2015.04)

(58) Field of Classification Search
CPC ....... F16T 1/22; F16T 1/32; F16T 1/20; F16T 1/26; F16T 1/28; F16T 1/30; F16T 1/305; F16T 1/38; F16T 1/383; F16T 1/00; F16K 24/042; F16K 24/044; F16K 24/048; F16K 33/00; F16K 31/18; F16K 31/22; F16K 31/30; G05D 16/12; A61M 2205/3379; A61M 3/0245; A61M 3/0241; F24F 2013/227; F24F 13/22; Y10T 137/6004; Y10T 137/7404; Y10T 137/7485; Y10T 137/7481; Y10T 137/3003; Y10T 137/3021; Y10T 137/3052; Y10T 137/3068; Y10T 137/3071; Y10T 137/3074; Y10T 137/3077; Y10T 137/3084; Y10T 137/2514; Y10T 137/267; Y10T 137/2675; Y10T 137/2965; Y10T 137/2534; Y10T 137/2536; Y10T 137/2577; Y10T 137/1353; Y10T 137/7316; Y10T 137/7319; Y10T 137/7323

USPC ........ 137/98, 101.25, 115.02, 122, 120, 165, 137/171, 172, 177, 183, 187, 192, 409, 137/434, 448

See application file for complete search history.

(56) References Cited

U.S. PATENT DOCUMENTS

| 1,363,732 A | 12/1920 | Heidmann |
| 1,549,566 A | 8/1926 | Bain |

(Continued)

FOREIGN PATENT DOCUMENTS

| AU | 2016420053 | 3/2020 |
| CA | 3029390 | 9/2020 |

(Continued)

OTHER PUBLICATIONS

U.S. Appl. No. 62/914,589, filed Oct. 14, 2019, Des Champs.

(Continued)

*Primary Examiner* — Craig J Price
(74) *Attorney, Agent, or Firm* — Michael Haynes PLC; Michael N. Haynes

(57) ABSTRACT

Certain exemplary embodiments can provide a system, machine, device, and/or manufacture that is configured for operably releasing condensate received from a condensate-producing unit toward a drain without allowing a substantial quantity of gas to flow through the system, machine, device, and/or manufacture, those embodiments including a float and/or a housing.

18 Claims, 14 Drawing Sheets

(51) Int. Cl.
  *F16T 1/20*  (2006.01)
  *F16T 1/38*  (2006.01)
  *F16T 1/32*  (2006.01)
  *F16T 1/02*  (2006.01)

(56) References Cited

U.S. PATENT DOCUMENTS

| | | | |
|---|---|---|---|
| 1,709,678 A | 4/1929 | Miller | |
| 2,117,056 A | 5/1938 | Dunn | |
| 2,277,647 A | 3/1942 | Jones | |
| 2,760,596 A | 8/1956 | Kellie | |
| 3,270,770 A * | 9/1966 | Wilson | A01K 7/04 137/434 |
| 3,584,642 A * | 6/1971 | Wilson | A01K 7/04 137/270 |
| 3,799,186 A | 3/1974 | Bulin | |
| 4,007,759 A | 2/1977 | Martin | |
| 4,475,569 A | 10/1984 | Foller | |
| 4,527,584 A | 7/1985 | Miller | |
| 4,627,460 A | 12/1986 | Eising | |
| 4,722,744 A | 2/1988 | Stoll | |
| 4,742,842 A | 5/1988 | Garneau | |
| 4,856,550 A | 8/1989 | Smelcer | |
| 4,918,935 A | 4/1990 | Trent | |
| 5,080,126 A | 1/1992 | De Rycke | |
| 5,115,798 A | 5/1992 | Moore | |
| 5,201,340 A | 4/1993 | Teepe | |
| 5,341,653 A | 8/1994 | Tippmann | |
| 5,348,041 A | 9/1994 | Clark | |
| 5,379,749 A | 1/1995 | Rieke | |
| 5,582,159 A | 12/1996 | Harvey | |
| 5,644,925 A | 7/1997 | Chaves | |
| 5,644,935 A | 7/1997 | Jonovich et al. | |
| 5,704,343 A | 1/1998 | Ahn | |
| 5,797,426 A | 8/1998 | Powell | |
| 6,009,898 A | 1/2000 | Risch | |
| 6,302,136 B1 | 10/2001 | Weaver | |
| 6,419,662 B1 * | 7/2002 | Solazzo | A61M 3/0241 604/248 |
| 6,698,225 B2 | 3/2004 | Chaves | |
| 6,823,885 B2 | 11/2004 | Hotta | |
| 6,895,771 B1 | 5/2005 | Cantolino | |
| 6,931,882 B1 | 8/2005 | Yang | |
| 7,096,880 B2 * | 8/2006 | Aoki | F16T 1/24 137/192 |
| 7,389,651 B2 | 6/2008 | Cantolino | |
| 7,578,932 B2 | 8/2009 | Cantolino | |
| 7,854,238 B2 | 12/2010 | Zatarain | |
| 8,056,553 B2 | 11/2011 | Khan | |
| 8,555,915 B2 | 10/2013 | Brunner | |
| 9,777,957 B1 | 10/2017 | Des Champs | |
| 10,488,088 B2 | 11/2019 | Verma | |
| 10,591,185 B1 | 3/2020 | Des Champs | |
| 10,603,605 B1 | 3/2020 | Mills | |
| 10,605,480 B1 | 3/2020 | Des Champs | |
| 10,712,044 B1 | 7/2020 | Des Champs | |
| 10,731,772 B2 | 8/2020 | Czyszczon | |
| 10,775,073 B2 | 9/2020 | Des Champs | |
| 10,837,672 B1 | 11/2020 | Des Champs | |
| 2003/0037561 A1 | 2/2003 | Chaves | |
| 2003/0098061 A1 | 5/2003 | Stuchlik, II | |
| 2005/0155535 A1 | 7/2005 | Rieke | |
| 2006/0272705 A1 * | 12/2006 | Sugawara | F16K 33/00 137/192 |
| 2007/0277882 A1 * | 12/2007 | Oshima | F16K 31/22 137/397 |
| 2008/0099083 A1 | 5/2008 | Nishimoto | |
| 2009/0229539 A1 | 9/2009 | Young | |
| 2011/0174202 A1 | 7/2011 | Gedcke | |
| 2011/0174461 A1 | 7/2011 | Kowald | |
| 2013/0306163 A1 | 11/2013 | Hubbard | |
| 2019/0226715 A1 | 7/2019 | Des Champs | |

FOREIGN PATENT DOCUMENTS

| | | |
|---|---|---|
| DE | 827066 | 1/1952 |
| EP | 3338033 | 2/2020 |
| GB | 2479772 | 10/2011 |
| WO | WO 18/034636 | 2/2018 |

OTHER PUBLICATIONS

U.S. Appl. No. 63/025,541, filed May 14, 2020, Des Champs.
U.S. Appl. No. 16/902,410, filed Jun. 16, 2020, Des Champs.
Dura Plastic Products, Inc., "UVR Fittings", Jan. 1, 2021, 12 page(s), http://www.duraplastics.com/userfiles/file/assets/files1/uvr-fittings-8015.pdf.
"Carrier Condensate trap", Jan. 30, 2018, 1 page(s), https://www.zoro.com/carrier-condensate-trap-319830-402/i/G5562280/ . . . 2 of 4.
"Lennox Condensate Drain Trap", Jan. 30, 2018, 1 page(s), https://www.zoro.com/lennox-condensate-drain-trap-61m35/i/G5560628/ 2 of 4.

* cited by examiner

SYSTEMS, DEVICES, AND/OR METHODS FOR MANAGING CONDENSATE

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

Figure 1:
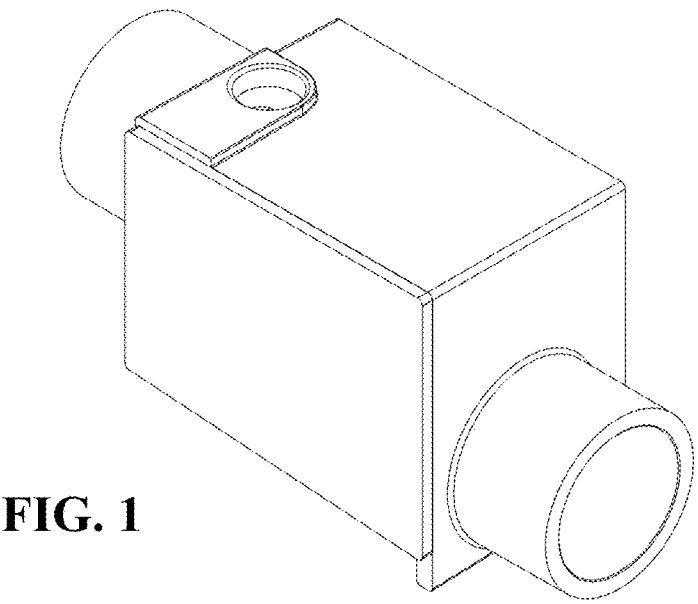
FIG. 1 is a perspective view of an exemplary embodiment of a condensate management trap.
Figure 2:
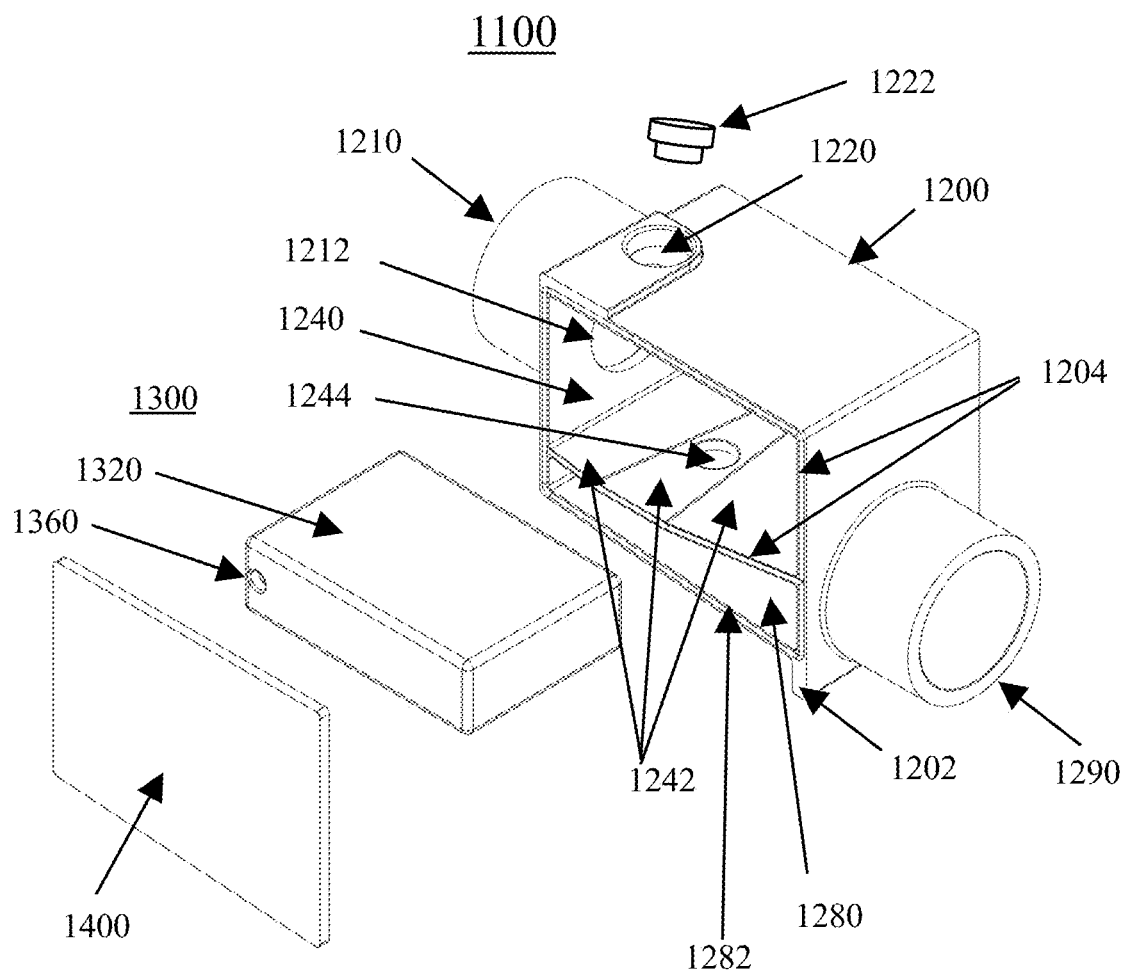
FIG. 2 is an assembly view of an exemplary embodiment of a condensate management trap.
Figure 3:
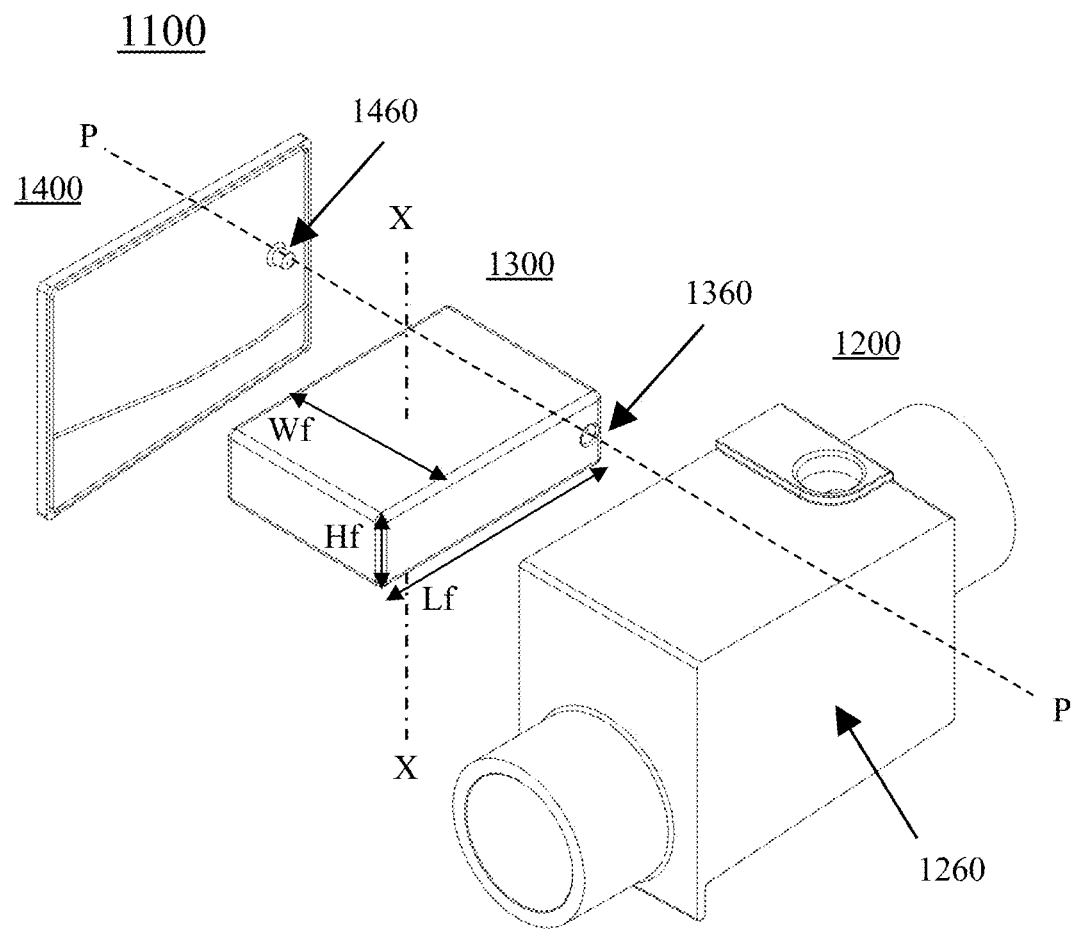
FIG. 3 is an assembly view of an exemplary embodiment of a condensate management trap.
Figure 4:
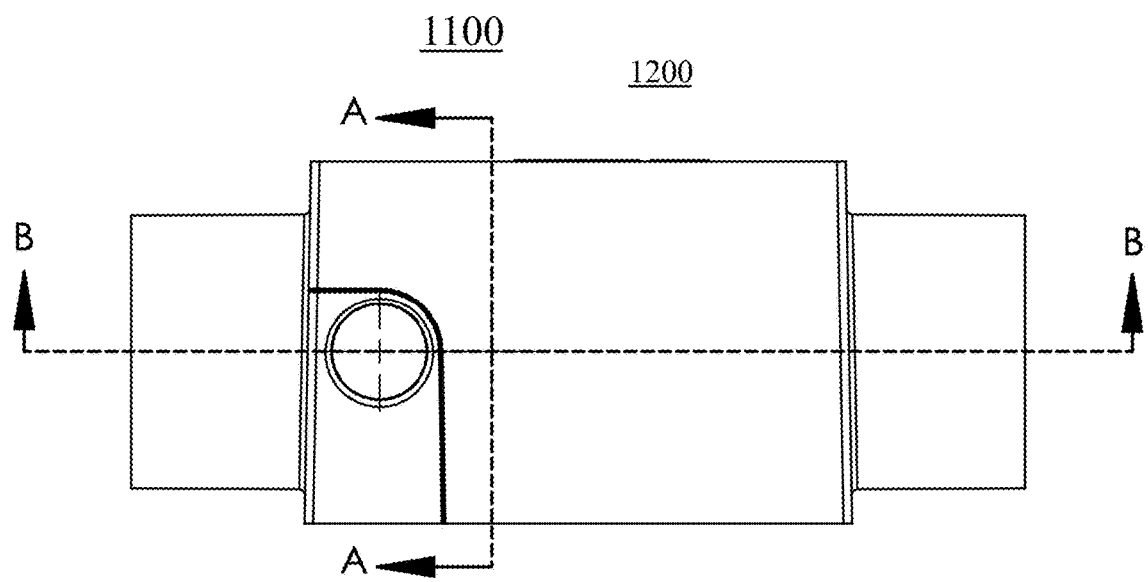
FIG. 4 is a top view of an exemplary embodiment of a condensate management trap.

| Drawing Key | |
|---|---|
| Element Name | Element Number |
| Condensate management system | 1000 |
| Condensate conduit | 1020 |
| Drain conduit | 1040 |
| Condensate management trap | 1100 |
| Housing | 1200 |
| Housing edge | 1202 |
| Housing edge V-groove | 1204 |
| Entrance connector | 1210 |
| Entrance port | 1212 |
| Clean-out port | 1220 |
| Clean-out port stopper | 1222 |
| Float chamber | 1240 |
| Float chamber floor | 1242 |
| Float chamber port | 1244 |
| Float valve seat | 1246 |
| Float chamber back wall | 1260 |
| Float chamber pivot protrusion | 1262 |
| Float chamber top wall | 1264 |
| Float chamber proximal wall | 1266 |
| Float chamber distal wall | 1268 |
| Drain compartment | 1280 |
| Drain compartment floor | 1282 |
| Exit connector | 1290 |
| Exit port | 1292 |
| Bushing | 1294 |
| Float | 1300 |
| Float body | 1320 |
| Float proximal wall | 1322 |
| Float valve | 1340 |
| Float pivot recess | 1360 |
| Float interior | 1380 |
| Cover | 1400 |
| Cover periphery | 1420 |
| Cover V-protrusion | 1440 |
| Cover pivot protrusion | 1460 |
| Consensate-producing unit | 1500 |

DESCRIPTION

Certain exemplary embodiments relate to the technical field of heating, ventilating, and air conditioning ("HVAC"). Certain exemplary embodiments involve "traps" that allow condensate to drain from a condensate source, such as an HVAC, air conditioning, ice-making, cooling, humidifying, dehumidifying, and/or other condensate-producing unit, and simultaneously prevent a gas, such as ambient air, conditioned air, combustion gas, and/or drain gas from entering and/or escaping from the unit. Note that as used herein, "gas" need not be limited to any particular gas, but instead can be or include vapors, liquids, and/or solids, etc., such as any form of air, conditioned air, combustion gas, drain gas, smoke, steam, refrigerant, dust, etc.

As an example, certain exemplary embodiments are in the technical field associated with a condensate-producing unit that has a cooling coil to cool air going to and/or within a building. Note that as used herein, "air" need not be pure air, but instead can be or include vapors, liquids, and/or solids, etc., other than pure air, such as smoke, steam, refrigerant, dust, etc. During warm periods, the cooling coil can generate condensate (which herein will often be referred to as "water", although the condensate need not be the direct result of condensation, need not be water, and any water need not be pure (e.g., it can contain a refrigerant, minerals, dust, and/or debris, etc.)). More particularly, certain exemplary embodiments are in the technical field of a condensate drainage system that allows removal of water from a condensate-producing unit while simultaneously preventing the passage of air from the unit.

In certain exemplary embodiments, a device, referred to herein as an "air trap" or "condensate management trap", can use a pressure, such as that generated by an air moving device(s) within a condensate-producing unit, to prevent unwanted gasflow out of the condensate-producing unit via the condensate conduit. Thus, for example, an air trap can use air pressure to help "trap" airflow.

Certain exemplary embodiments need not require standing water to prevent gas from leaving a condensate-producing unit. With the occurrence of condensate within the unit, the condensate can flow out of the unit toward the trap but without escape of a substantial quantity/volume/flow of gas from the unit. When there is no condensate produced, there can be essentially no liquid remaining in the trap yet there can be substantially no gas flowing through the trap from the condensate-producing unit.

To remove condensate from a condensate-producing unit, a device known as a "P-trap" can be used. When properly designed and operating for a condensate-producing unit, a P-trap can allow condensate to exit the positively-pressured condensate-producing unit (and/or a portion and/or zone of the condensate-producing unit, i.e., the "positive side", such as a positive plenum) while preventing positively-pressured gas from leaving and/or can prevent ambient and/or drain gas from entering the condensate-producing unit when the unit is at negative pressure.

There can be several challenges, however, with using a P-trap, in certain exemplary applications:
standing water is required for sealing against airflow within the P-trap and that water can be prone to freezing if the condensate-producing unit is installed in an unheated space such as an attic or commercial rooftop unit;
to maintain a sufficient water level to allow the P-trap to operate properly at beginning of the cooling season, the trap typically must be very deep to prevent dry-out from evaporation, which can lead to sludge buildup at the bottom of the "U" shaped section;
to handle a large pressure differential between ambient and high pressure sides of the condensate-producing unit (e.g., between the inlet and outlet of the trap), a P-trap would need to extend well below the condensate pan and even the frame of the condensate-producing unit, and possibly a substantial distance into the floor that supports the condensate-producing unit, resulting in the need for rails or curbs to be placed under the unit to raise the drain pan and enable enough height between the drain pan outlet and the bottom of the trap; and/or
to prevent the sealing water from being blown out of the trap and the loss of an air seal.

Our attempts to solve the problems associated with using P-traps for certain exemplary applications have presented several further challenges. For example, P-traps can require a relatively large reservoir of liquid stored within the trap to prevent evaporation and/or loss of water seal This large amount of liquid, in many installations, can be prone to freezing, which can damage the trap, the condensate conduit, components of the condensate-producing unit, and/or the building structure.

As another example, when the condensate-producing unit is first installed, it is highly likely that the liquid in the trap reservoir is nonexistent or has receded to a level that permits gas, such as conditioned air or combustion gas, to flow from the positive pressure side of the fan, through the interstices of the trap, and into the drain.

Certain exemplary embodiments can accomplish the functions desired for a condensate management trap without encountering such challenges. Certain exemplary embodiments can trap and release condensate and/or deter and/or prevent gas, such as conditioned air, from leaving the positive pressure side of the condensate-producing unit, all within an extremely compact design that potentially can remain in a substantially horizontal orientation.

Certain exemplary embodiments can provide a condensate management trap or air trap that is configured to operate dry when the condensate-producing unit is not producing condensate but is otherwise operating to heat, sensibly cool, or simply move air. Certain exemplary embodiments can provide a condensate management trap that, when the unit is operating, allow condensate to flow from a point of condensate generation within the unit, through the trap, and to a drain, such as a house gutter, a roof drain, a sewer, and/or a ground level storm drain, while simultaneously deterring and/or not allowing positively pressured gas to flow out of the unit's positively pressurized side or ambient air to be drawn into the unit.

Certain exemplary embodiments can be designed and/or constructed to selectively release condensate while accommodating any of a wide variety of pressure differentials (PDs) (as measured between the entrance to the trap and its exit), those PDs ranging from 0 to 100 inches water column (WC) (0 to 3.6 psi), using a relatively small difference in height between their condensate entrance and condensate exit. That height difference can be sufficiently short to allow for installing the trap between (1) where the condensate conduit that extends from the condensate-producing unit's case or frame and (2) the ground, roof, or slab or the bottom of the case, frame, and/or curb without modifying any of these items. Nevertheless, in such installations, the bottom of the trap generally can be sufficiently high off the ground, roof, or slab to enable the drain conduit leaving the trap to slope sufficiently to cause condensate to reliably and/or reasonably expeditiously flow through that drain conduit toward the final drain, such as at a rate/slope of approximately 1 inch of elevation drop for every 8 feet of horizontal length. Given the very small vertical distance between their condensate entrance and condensate exit, such exemplary traps need not require:
1. lifting the condensate-producing unit;
2. placing the condensate-producing unit on a higher curb or rails;
3. placing the condensate-producing unit on any curb or rails;
4. drilling holes in the roof;
5. running piping below the roof;
6. putting the trap inside the building; and/or
7. putting an electric water pump in the condensate drain pan to pump the condensate to a final drain.

Referring to the various views of FIGS. 1-26, certain exemplary embodiments of a condensate management system 1000, which can include a condensate conduit 1020, a drain conduit 1040, and a condensate trap 1100, which can include a trap housing 1200, a float 1300 configured to float when a level of condensate therein reaches a predetermined height, and/or a cover 1400 configured to render housing 1200 substantially free from condensate leakage. Trap 1100 can be supplied by condensate conduit 1020 that receives condensate from condensate-producing unit 1500 and can release condensate to drain conduit 1040.

Defined by and/or integral to trap housing 1200 can be a housing edge 1202 into which is formed housing edge V-groove 1204 that can receive a V-protrusion formed in a cover that can be attached to and substantially seal a side of housing 1200. Defined by and/or integral to trap housing 1200 can be an entrance connector 1210 to which substantially horizontally-extending condensate conduit 1020 that supplies condensate to trap 1100 can be coupled, such as via a threaded or cemented connection. Defined by and/or integral to trap housing 1200 can be a substantially vertically-oriented entrance port 1212 via which condensate can enter float chamber 1240. Defined by and/or integral to trap housing 1200 can be a substantially horizontally-oriented clean-out port 1220 that can provides access to float chamber 1240 for flushing and/or removing debris that accumulates therein. Clean-out port 1220 can be configured to be closed and/or sealed via a clean-out port stopper, which can be, e.g., a rubber stopper, threaded plug, etc.

Defined by and/or integral to trap housing 1200 can be a float chamber floor 1242 that can help define a float chamber 1240. To encourage any debris entrained in the condensate from settling in float chamber 1240, each portion of float chamber floor 1242 can be sloped, in one or more directions, at its own angle (from horizontal) of from approximately 1 degree to approximately 15 degrees (including all values and subranges therebetween, e.g., approximately 2, 2.75, 4, 5.1, 6, 8, 9, 11.9, 14.14, etc. degrees), toward a float chamber port 1244 defined therethrough. Condensate can exit float chamber 1240 via a substantially horizontally-oriented float chamber port 1244 and into a drain compartment 1280.

Float chamber floor 1242, in an area adjacent to where condensate exits float chamber port 1244, can define a substantially horizontally-oriented float valve seat and/or surface 1246 that can substantially sealingly contact a float valve 1340 to trap condensate that enters float chamber 1240 within float chamber 1240 (and possibly further upstream). That is, when closed, float valve 1340 can substantially and/or selectively prevent condensate from continuously flowing through trap 1100, and instead cause that condensate to backup behind float valve 1340, at least partially filling float chamber 1240, and potentially backing up into substantially horizontally-extending condensate conduit 1020 and toward the condensate-producing unit. Such trapping of condensate within float chamber 1240 by float valve 1340 can continue until the buoyant torque (Tb) generated about pivot axis P-P due to the buoyancy of float 1300 while in contact with that condensate overcomes any opposing pressure torque (Tp) generated by a positive pressure bearing on the float 1300. At that time, the buoyant torque can cause float valve 1340 to lift off of seat 1246, thereby allowing condensate to begin flowing through float chamber port 1244. Such flowing can continue until Tb becomes less than Tp, at which point float valve 1340 can re-seat in the float valve seat 1246, which will again cause flow of condensate through trap 1100 to substantially cease as condensate again begins to back-up in float chamber 1240. Alternatively, assuming a relatively constant flowrate of condensate from the condensate-producing unit, that flowrate less than the maximum flowrate that trap 1100 can transfer and/or manage, the condensate level in float chamber 1240 can become substantially constant and/or can vary slowly, such that float 1300 continues floating and/or float valve 1340 remains unseated. Thus, float valve 1340 can automatically cycle open and closed, can remain open, and/or can automatically vary in the degree to which it is open and/or the degree to which it resists condensate flow.

Defined by and/or integral to trap housing 1200 can be a substantially vertically-oriented float chamber back wall 1260 upon which a substantially horizontally-extending float chamber pivot protrusion 1262 can be attached and/or integrally included, that protrusion configured to, in concert with an opposing but geometrically similar substantially horizontally-extending cover pivot protrusion 1460, floatingly support float 1300 within float chamber 1240.

Defined by and/or integral to trap housing 1200 can be a drain compartment floor 1282 that can help define a drain compartment 1280. Defined by and/or integral to trap housing 1200 can be an exit connector 1290. Drain compartment floor 1282 can direct condensate that exits float chamber 1240 through float chamber port 1244 to a substantially vertically-oriented exit port 1292, which can direct that condensate from drain compartment 1280 to exit connector 1290 where it can enter a substantially horizontally-extending drain conduit 1040 (which can be connected thereto, via e.g., threads and/or cement) from which that condensate can flow away from trap 1100. To encourage any debris entrained in the condensate from settling in drain compartment 1280, drain compartment floor 1282 can be sloped, in one or more directions, at an angle (from horizontal) of from approximately 1 degree to approximately 15 degrees (including all values and subranges therebetween, e.g., approximately 2.75, 4, 5.1, 8, 8.9, 12, etc. degrees), toward exit port 1292.

Exit connector 1290 can be positioned on trap 1100 and/or configured to accept a bushing 1294, which can allow drain conduit 1040 to be smaller in outer diameter than the inner diameter of exit connector 1290. In this manner, drain conduit 1040 can be any of multiple pipe sizes yet still couple to trap 1100. Moreover, once condensate flow into float chamber 1240 ceases, this positioning and/or configuration of exit connector 1290, for a variety of outer diameters of the chosen drain conduit 1040, can prevent any standing condensate from remaining in drain compartment 1280 after a predetermined time, such as approximately 0.25 to 20 minutes after condensate flow into float chamber 1240 ceases. Alternatively, the positioning and/or configuration of exit connector 1290, for a variety of outer diameters of the chosen drain conduit 1040, can prevent a sufficient height of standing condensate (as measured vertically upwards from drain compartment floor 1282) to cause damage to trap 1100 upon freezing of that standing condensate, from remaining in drain compartment 1280 after a predetermined time, such as approximately 0.25 to 20 minutes after condensate flow into float chamber 1240 ceases. In other words, via the positioning and/or configuration of exit connector 1290, the level of any standing condensate remaining in drain compartment 1280 will be so low that, even if it freezes, trap 1100 will not experience freeze damage.

Float 1300 can be defined by a float body 1320, a substantially hollow and/or sealed float interior 1380 that can hermetically sealed with air and/or another gas such as carbon dioxide, helium, oxygen, etc., and/or a float valve 1340 that protrudes from, is attached to, and/or is integral with float body 1320 and/or defines an interior (not shown) that is separated from, contiguous with, and/or open to float interior 1380. Float 1300 can be installed within float chamber 1240, such as by rotably, pivotably, and/or loosely positioning float pivot recesses 1360 over float chamber pivot protrusion 1262 and/or cover pivot protrusion 1460. The centerline and/or centroidal axis of float valve 1340 (as measured parallel to the height of float 1300 and/or float body 1320) can be offset from the centerline and/or centroidal axis of float 1300 and/or float body 1320.

Float valve 1340 can be shaped as a half sphere, a segment of a sphere, a segment of an ellipsoid, a catenoid, a segment of a catenoid, a paraboloid, a segment of a paraboloid, a conoid, a cone, a truncated cone, a polyhedron, a tetrahedron, a parallelepid, a pyramid, a frustrum, an obelisk, or a wedge. The float interior 1380 and/or the interior of float valve 1340 need not be hollow, or if hollow can be filled with a material, such as a material having a density that is lower than that of water.

Float valve seat 1246 can be shaped to correspond to the shape of float valve 1340. For example, if float valve 1340 is shaped as a hemisphere, then float chamber port can be defined by a circle and float valve seat 1246 can be shaped as a circle and/or an annulus against which an annular portion of that hemisphere can substantially sealingly contact to substantially prevent flow of condensate through float chamber port 1244. Likewise, if float valve 1240 is shaped as a wedge, then float chamber port 1244 can be defined by a rectangle and float valve seat 1246 can be shaped as a rectangle and/or rectangular annulus. Note that float valve 1340 can be dimensioned such that a portion of float valve 1340 can protrude into float chamber port 1244 and/or through float chamber port 1244 and into drain compartment 1280.

To aid in assembling trap 1100, and particularly with inserting float 1300 into float chamber 1240 and aligning it on its pivot protrusions, housing 1200 can be formed with one side open. A cover 1400 can be used to cover that side and/or seal trap housing 1200 so that condensate that enters housing 1200 via entrance port 1212 does not leak out of housing 1200. Cover 1400 can be defined by an inner periphery 1420 and/or a cover V-protrusion 1440 that extends adjacent periphery 1420 and/or, when cover 1400 is in place, adjacent float chamber floor 1242. Cover V-protrusion 1440 can allow cover 1400 to substantially align with and/or substantially mate with housing edge V-groove 1204 to form, such as with the aid of cement, a substantially water-tight seal can be formed between cover 1400 and housing 1200. Note that the geometries can be reversed such that the V-groove is defined by and/or integral to cover 1400 and the V-protrusion is defined by and/or integral to housing 1200. Note also that the V-groove can be defined by and/or integral to both housing 1200 and cover 1400, those V-grooves configured to be substantially filled with an adhesive gasket.

A cover pivot protrusion can extend from an inner surface of cover 1400 and/or be configured to be received by a float pivot recess 1360 to thereby allow float 1300 to floatable pivot about a pivot axis P-P.

Figure 8:
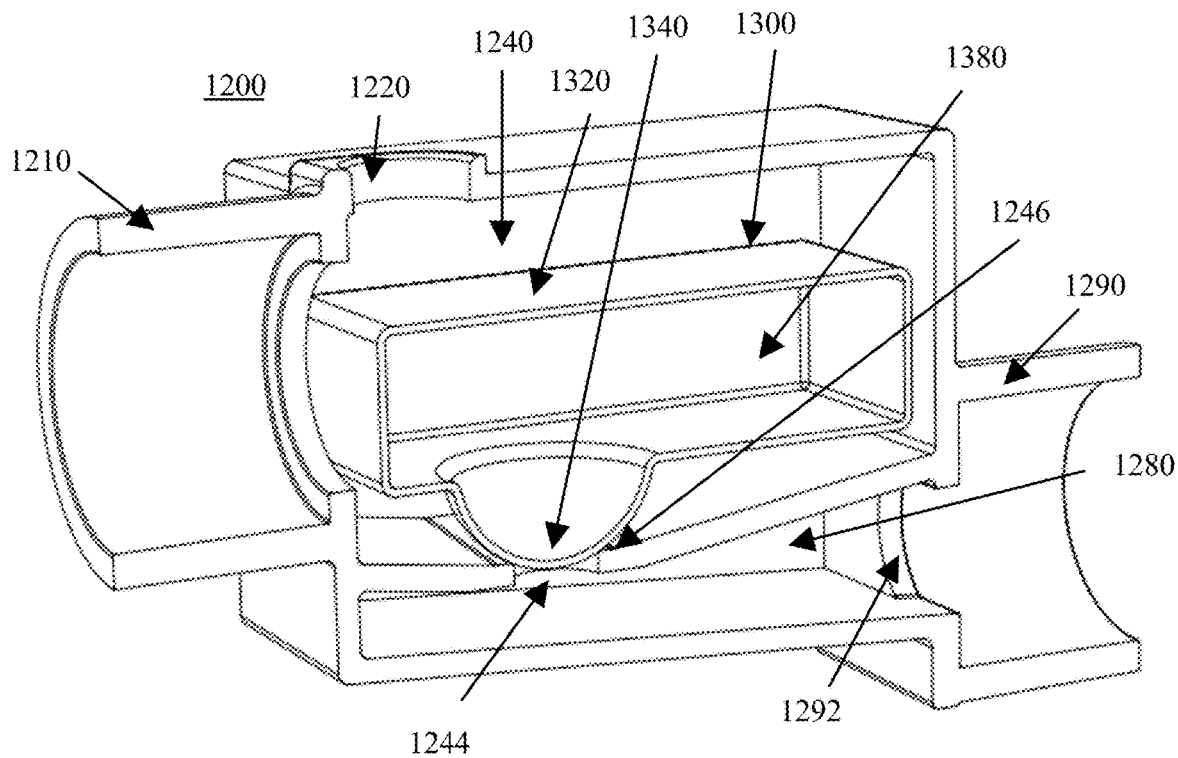
FIG. 8 is a side cross-sectional perspective view, taken at section B-B, of an exemplary embodiment of a condensate management trap.
Figure 9:
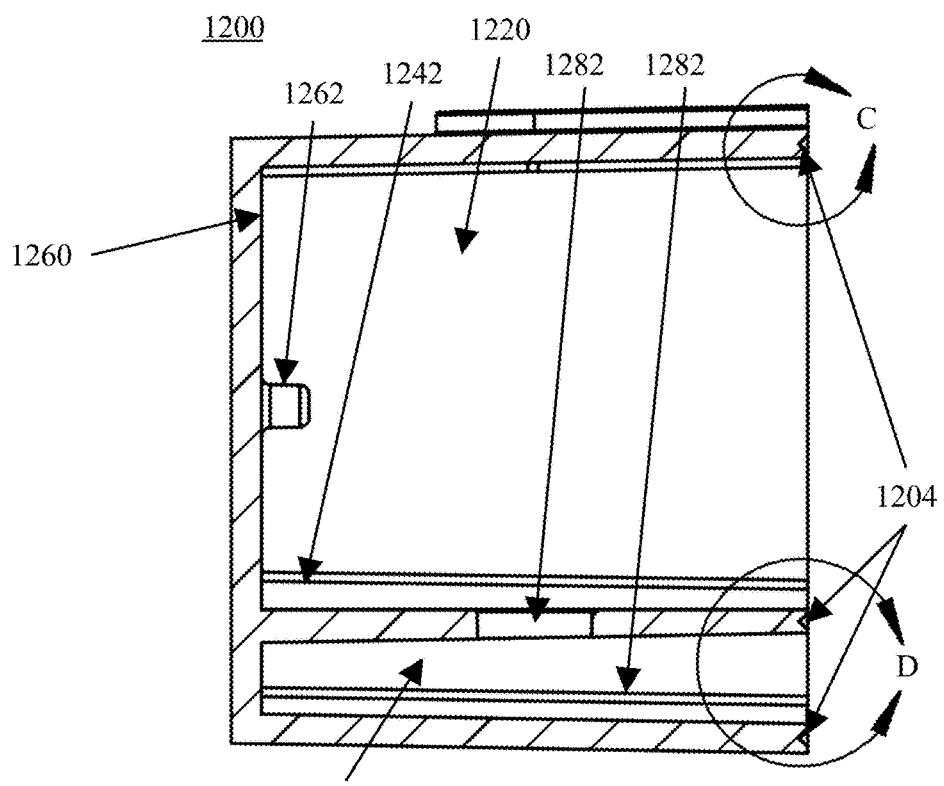
FIG. 9 is an end cross-sectional view, taken at section A-A, of a housing of an exemplary embodiment of a condensate management trap.
Figure 10:
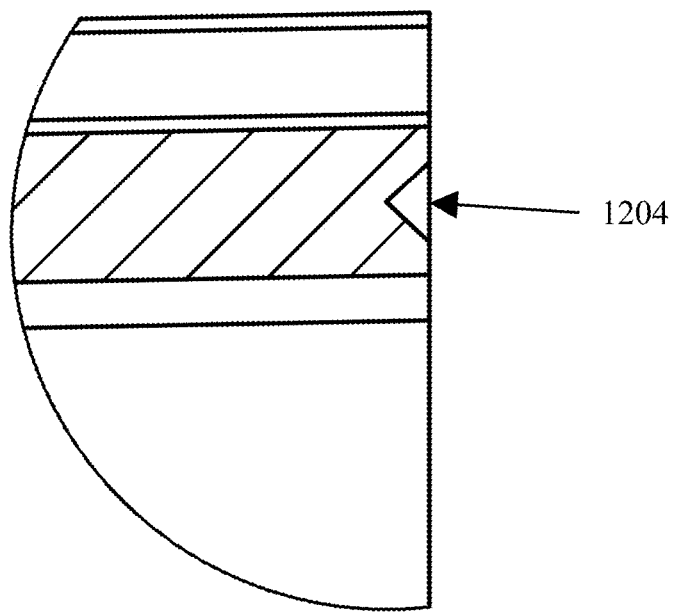
FIG. 10 is detail view, taken at detail C, of an exemplary embodiment of a housing of a condensate management trap.
Figure 11:
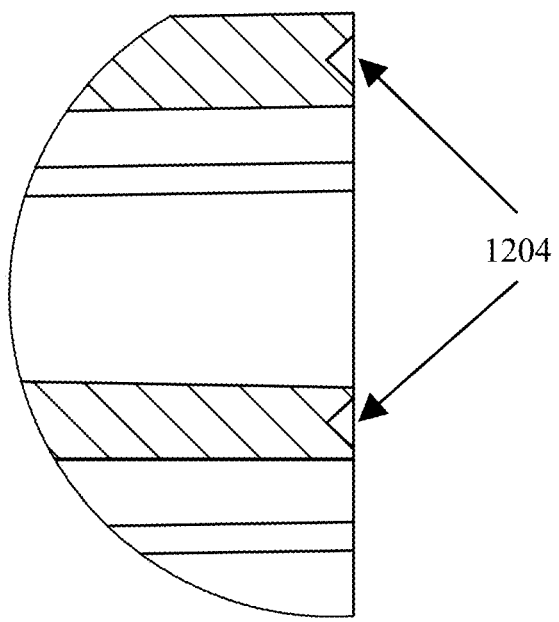
FIG. 11 is detail view, taken at detail D, of an exemplary embodiment of a housing of a condensate management trap.
Figure 12:
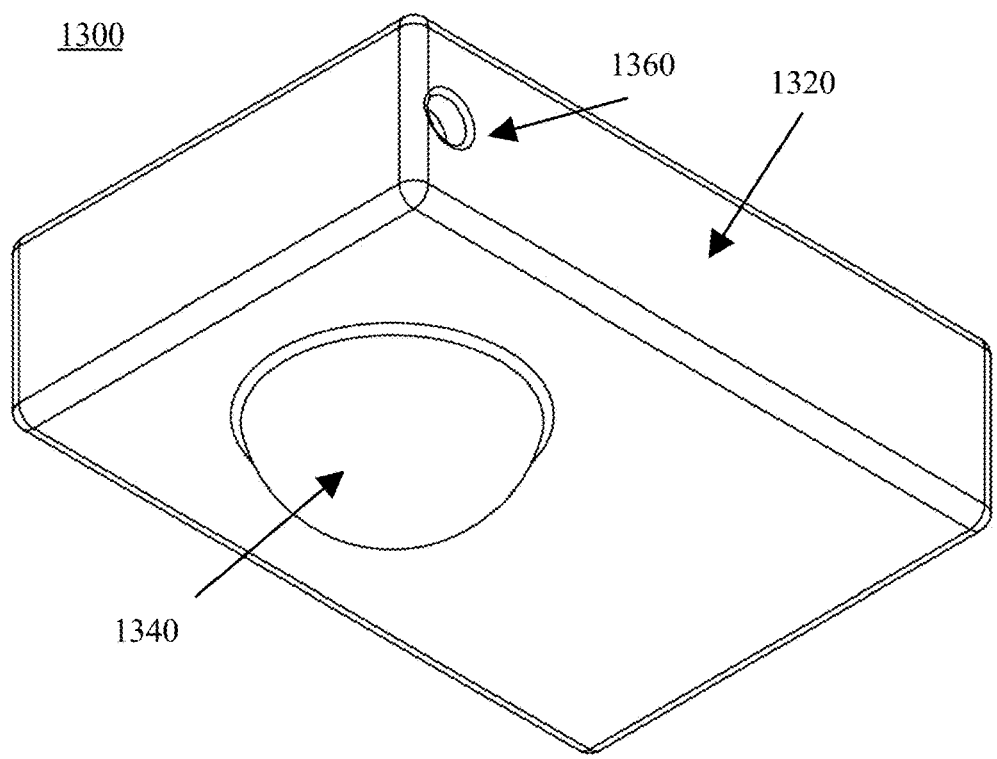
FIG. 12 is a perspective view of an exemplary embodiment of a float of a condensate management trap.
Figure 13:
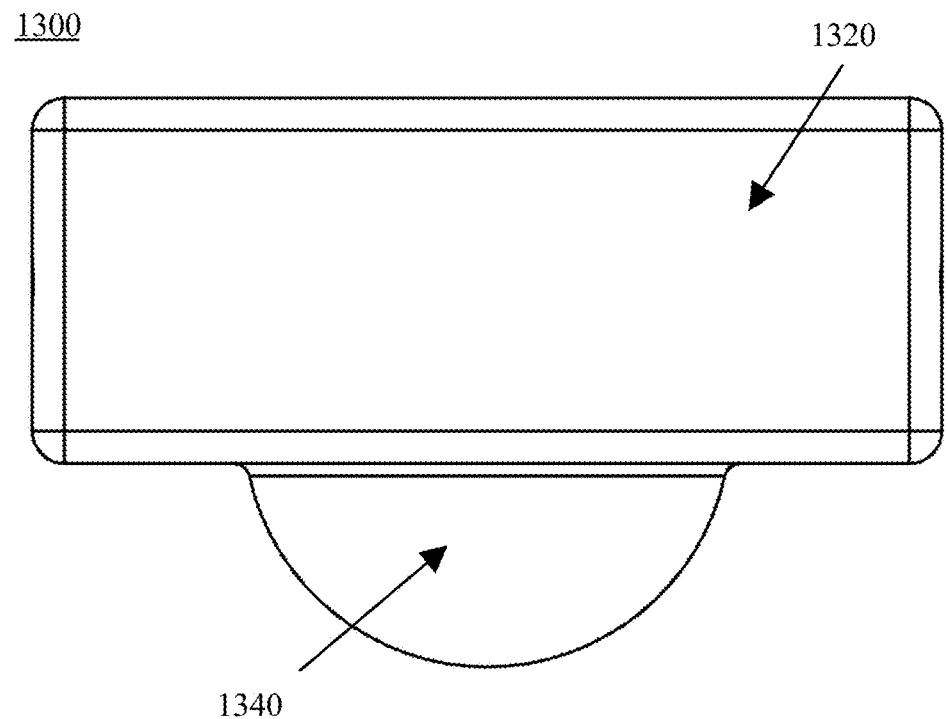
FIG. 13 is an end view of an exemplary embodiment of a float of a condensate management trap.
Figure 14:
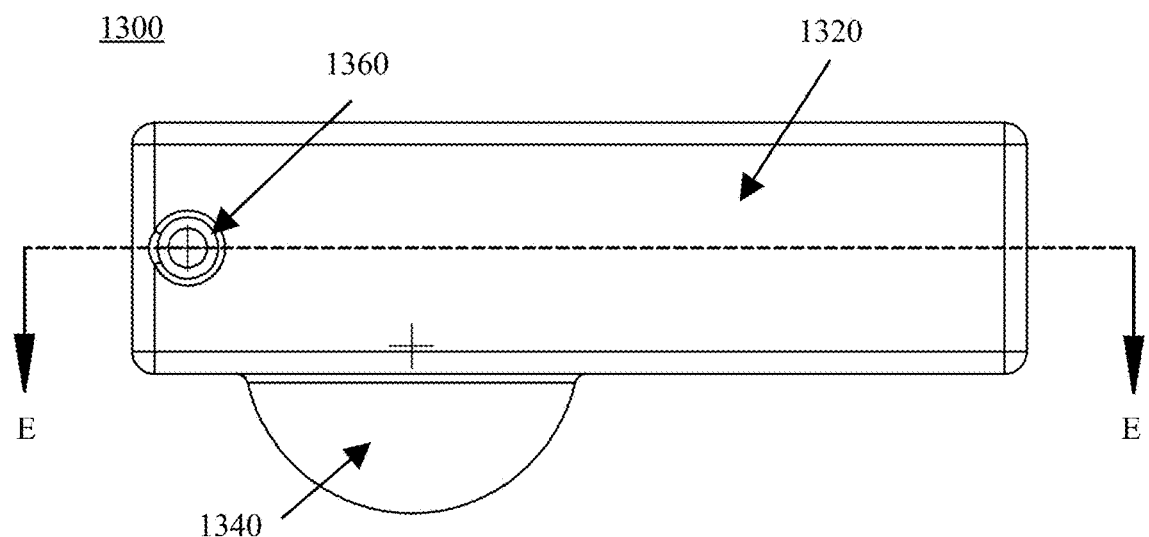
FIG. 14 is a side view of an exemplary embodiment of a float of a condensate management trap.
Figure 15:
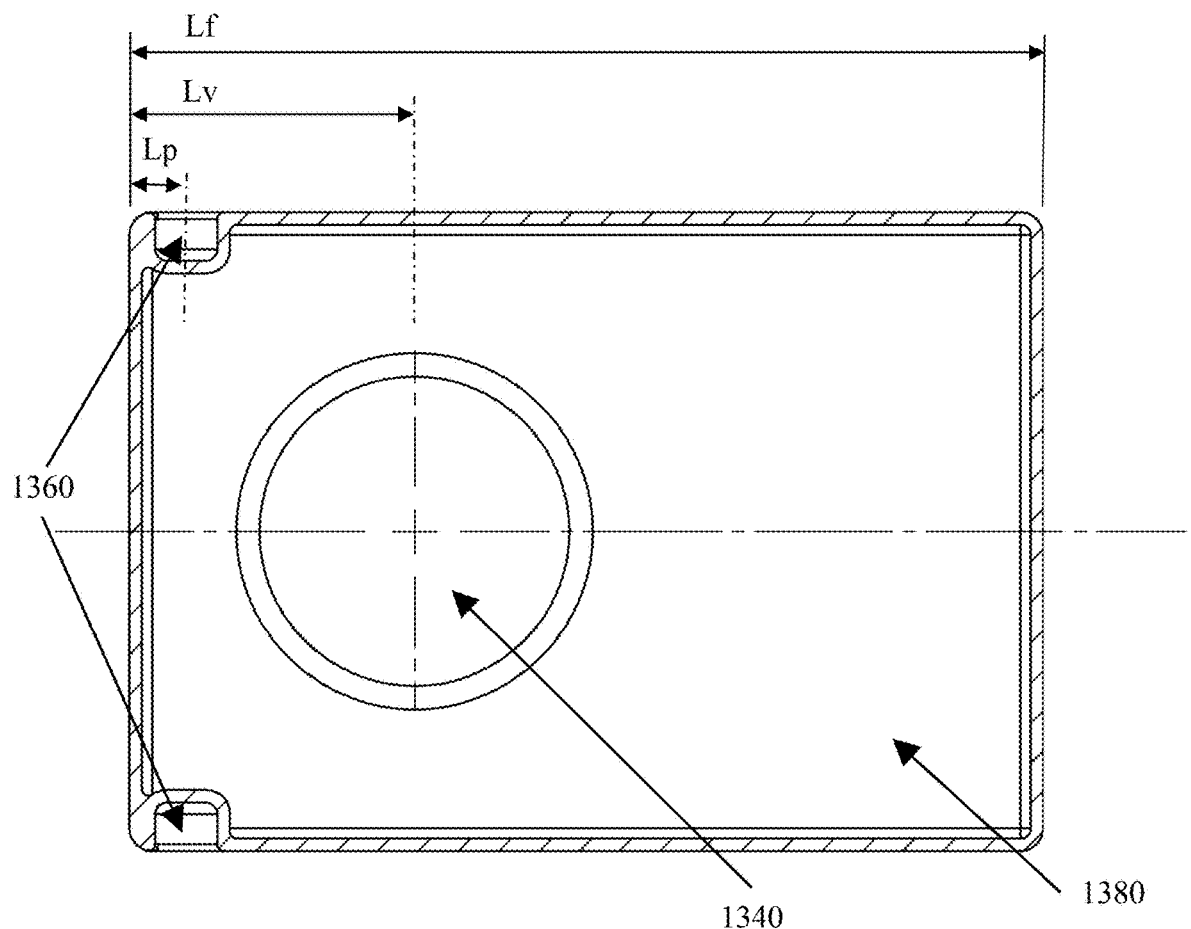
FIG. 15 is a bottom cross-sectional view, taken at E-E, of an exemplary embodiment of a float of a condensate management trap.
Figure 16:
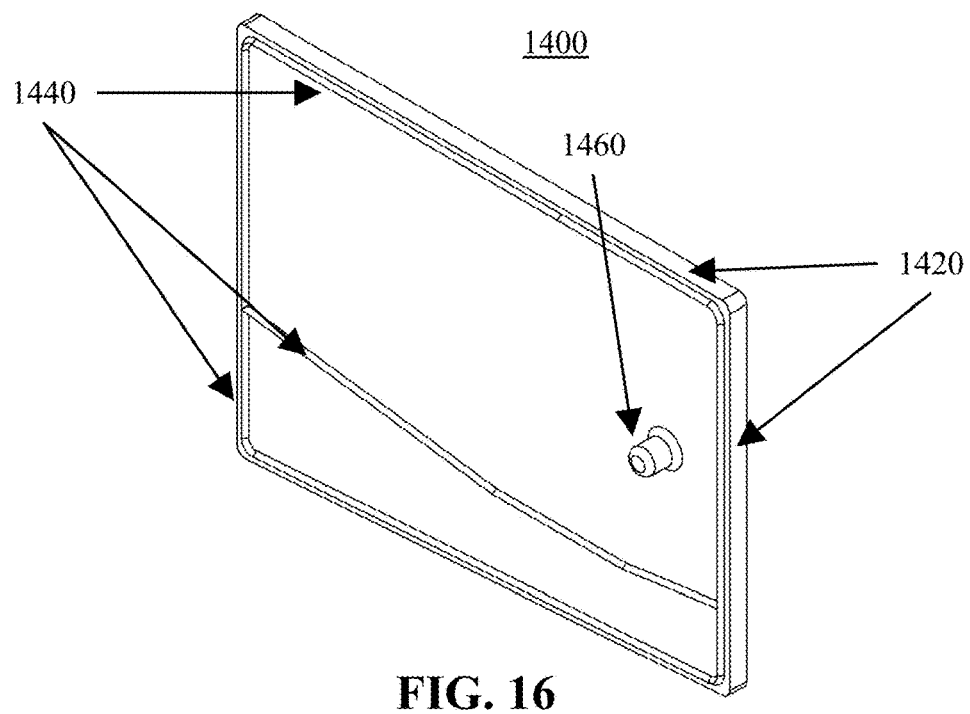
FIG. 16 is a perspective view of an exemplary embodiment of a cover of a condensate management trap.
Figure 17:
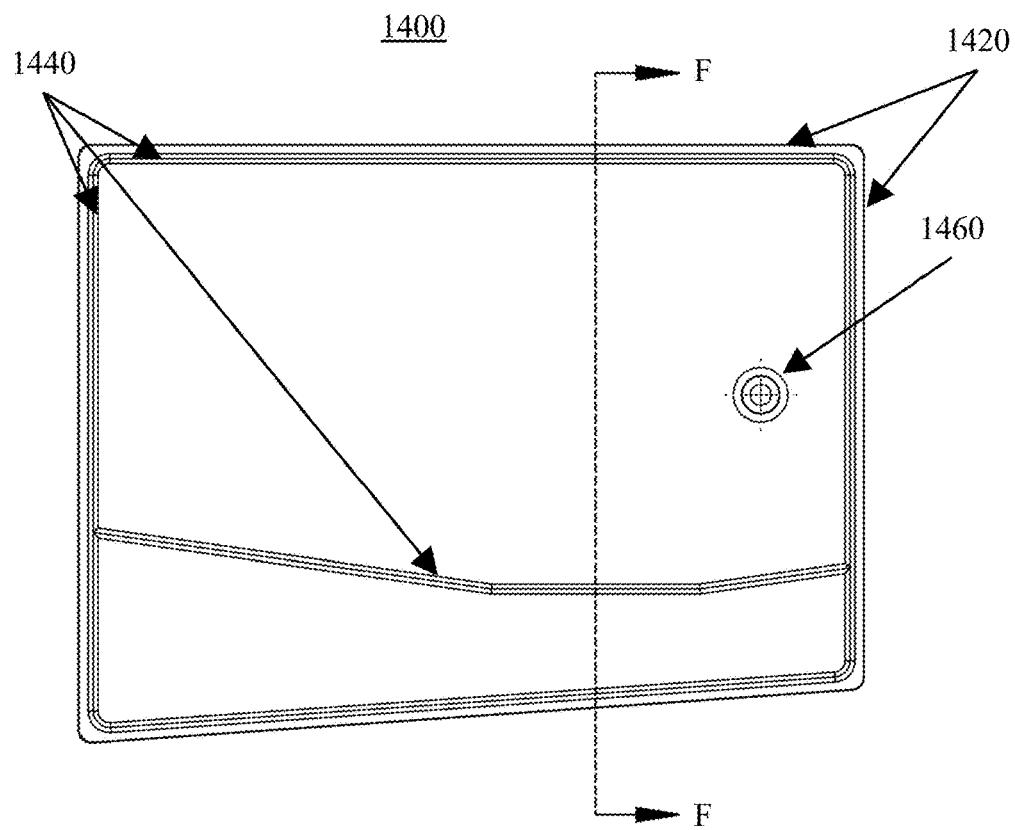
FIG. 17 is a perspective view of an exemplary embodiment of a cover of a condensate management trap.
Figure 18:
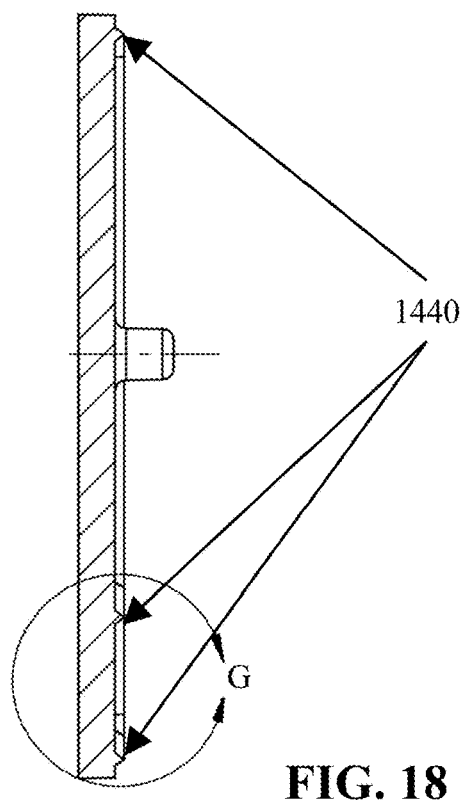
FIG. 18 is an end cross-sectional view, taken at section F-F, of a cover of an exemplary embodiment of a condensate management trap.
Figure 19:
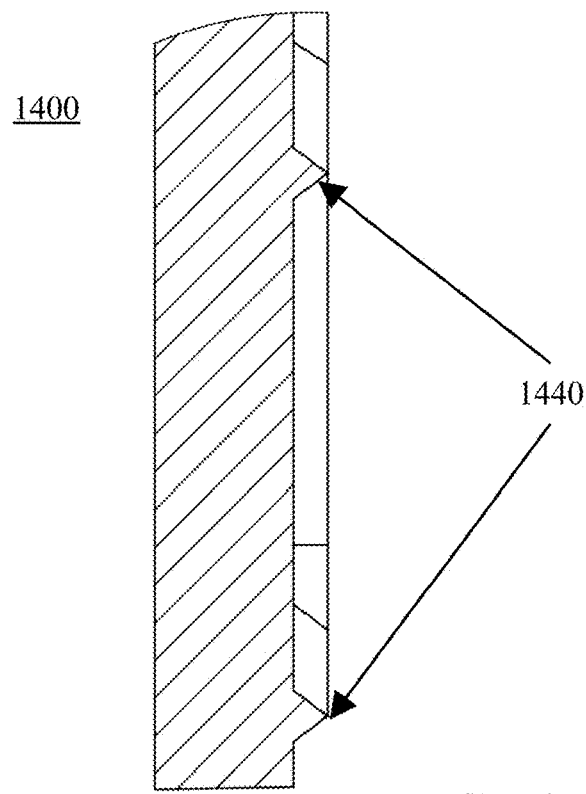
FIG. 19 is a detail view, taken at detail G, of a cover of an exemplary embodiment of a condensate management trap.
Figure 20:
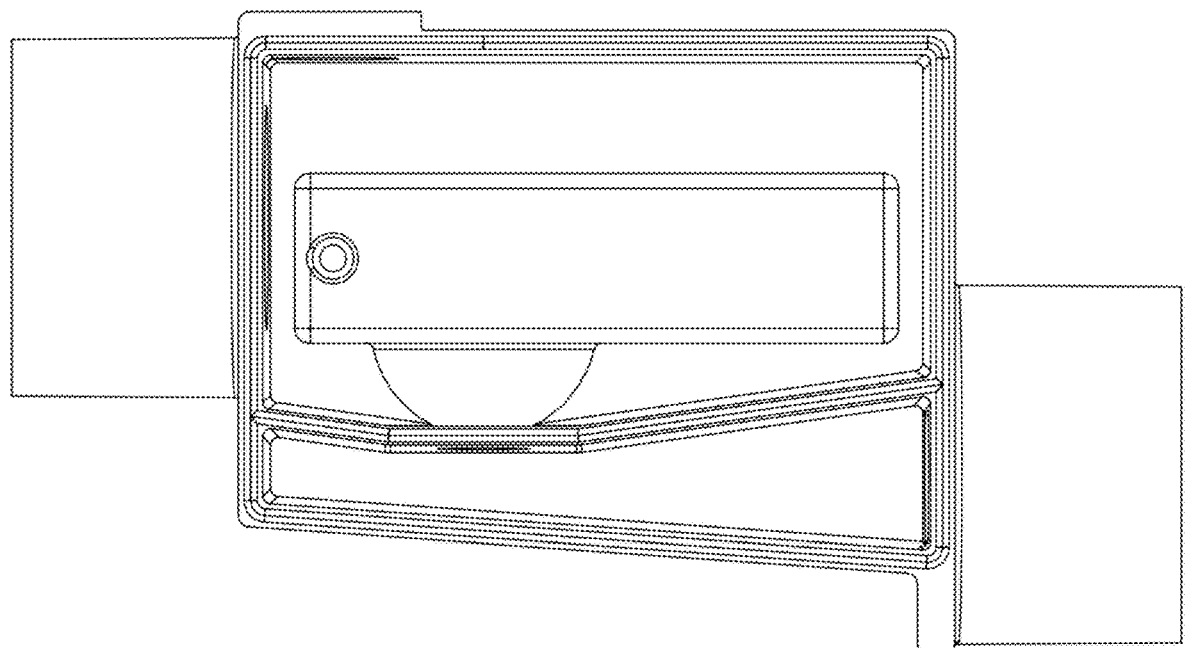
FIG. 20 is a side view of the interior of an exemplary embodiment of a condensate management trap.
Figure 21:
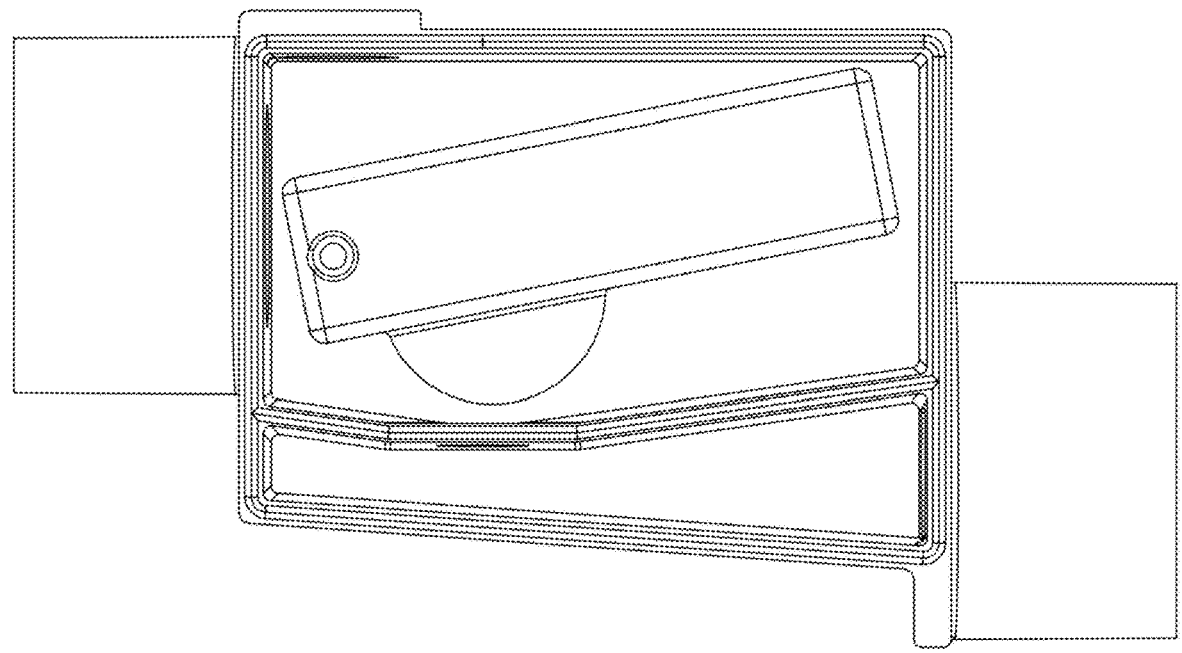
FIG. 21 is a side view of the interior of an exemplary embodiment of a condensate management trap.
Figure 22:
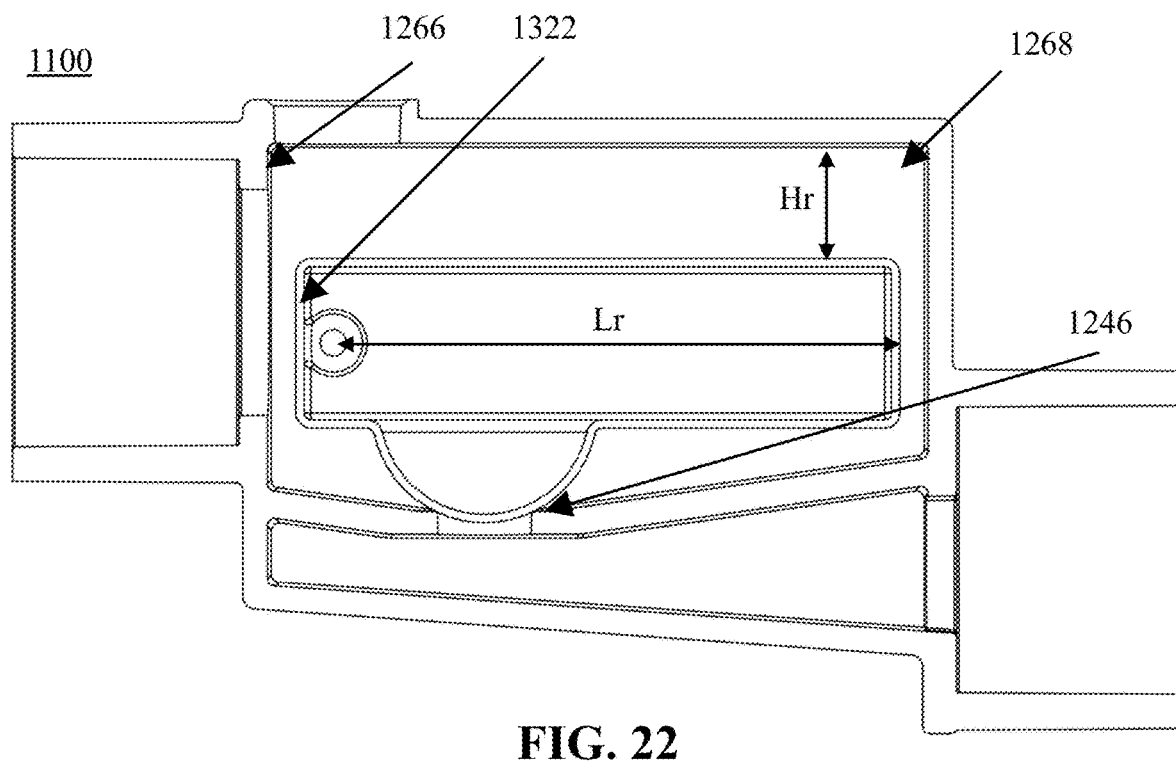
FIG. 22 is a side cross-sectional view, taken at section B-B of the interior of an exemplary embodiment of a condensate management trap.
Figure 23:
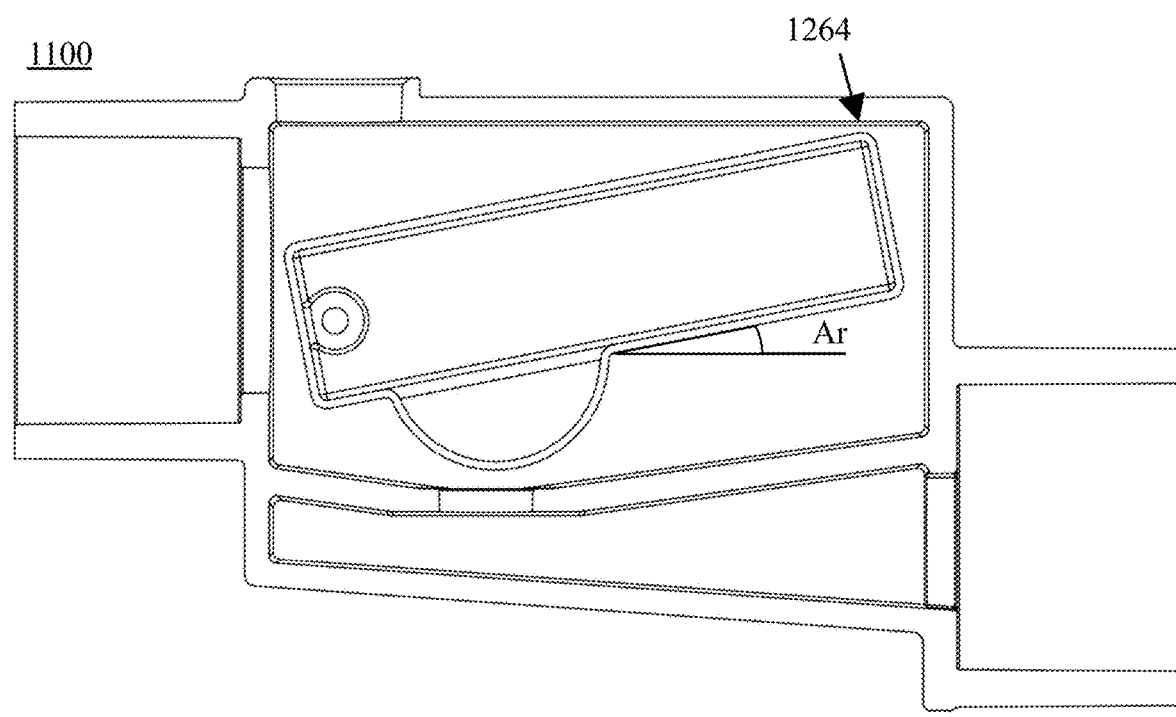
FIG. 23 is a side cross-sectional view, taken at section B-B of the interior of an exemplary embodiment of a condensate management trap.
Figure 24:
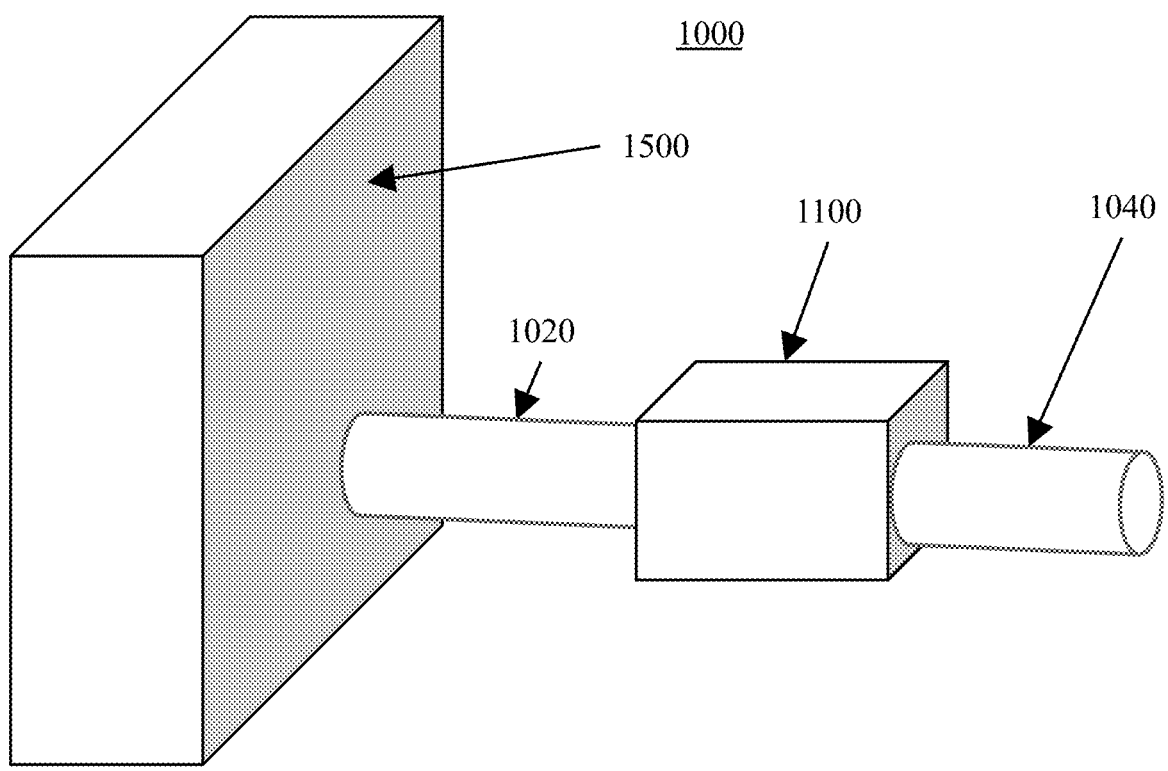
FIG. 24 is a perspective view of an exemplary embodiment of a condensate management system.
Figure 25:
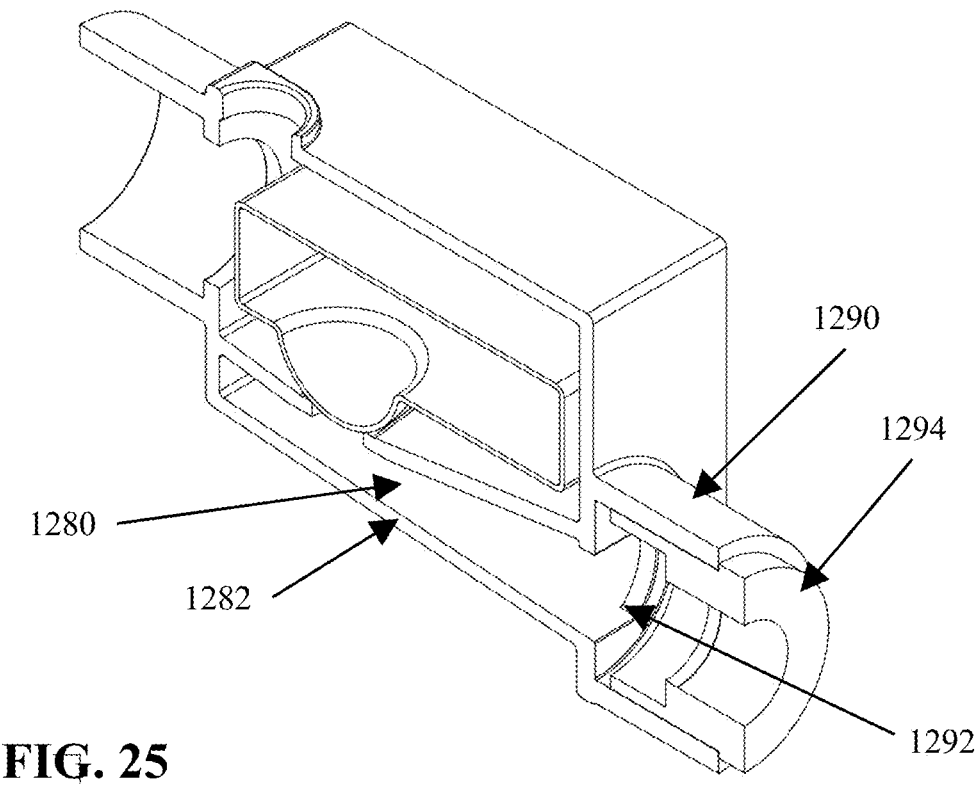
FIG. 25 is a cross-sectional perspective view, taken at section B-B, of an exemplary embodiment of a condensate management trap.
Figure 26:
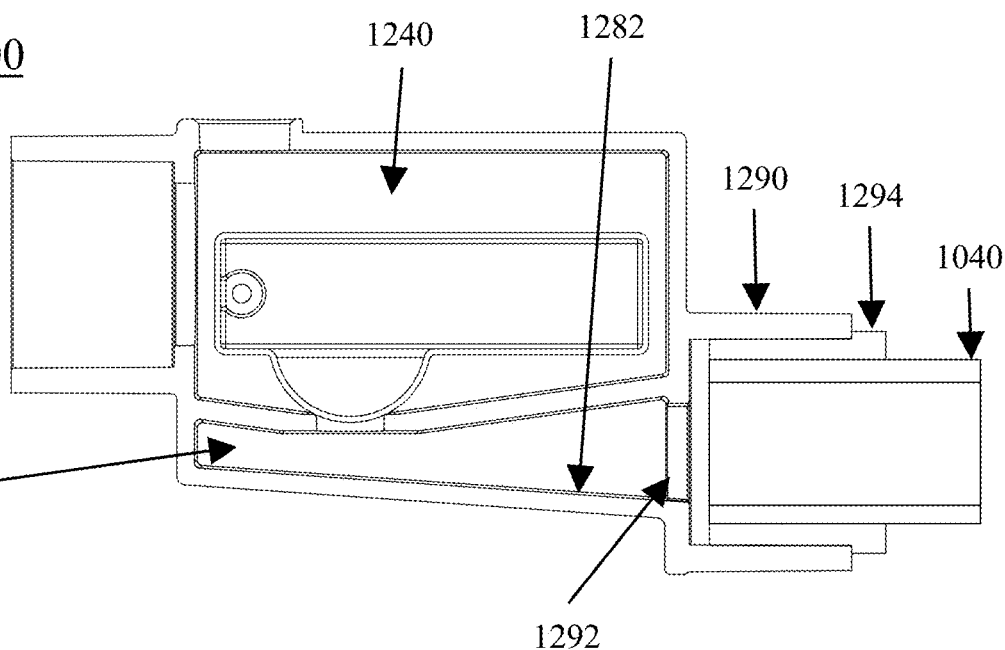
FIG. 26 is a side cross-sectional view, taken at section B-B, of an exemplary embodiment of a condensate management trap.

As shown in FIG. 8, when float 1300 is substantially sealing float chamber port 1244 such that substantially no condensate is flowing therethrough, float 1300 can define a substantially vertically extending height (Hf), a substantially horizontally extending width (Wf), and a substantially horizontally extending length (Lf), each of the Hf, Wf, and Lf orthogonal to each other.

The height (Hf) of the float can range from 0.5 to 2 inches (including all values and subranges therebetween, e.g., approximately 0.75, 1.01, 1.25, 1.499, 1.75, etc. inches). The width (Wf) of the float can range from 1 to 8 inches (including all values and subranges therebetween, e.g., approximately 1.5, 2, 2.75, 4.01, 5.25, 6.499, 7.75, etc. inches). The length (Lf) of the float can range from 2 to 12 inches (including all values and subranges therebetween, e.g., approximately 2.75, 5.01, 7.25, 8.499, 10.75, etc. inches). The range of positive PDs under which that trap 1100 can be configured to operatively function can range from 0 to 100 or more inches WC (including all values and subranges therebetween, e.g., approximately 2.75, 24.01, 55.25, 66.499, 87.75, etc. inches).

Certain ratios (e.g., Hf/Wf, Hf/Lf, Hf/(Wf/Lf), Wf/Lf, etc.) of these dimensions can be meaningful and/or critical to the design and/or correct operation of certain exemplary embodiments. For example, the ratio of Hf/Wf can range from about 0.25 to about 1 (including all values and subranges therebetween, e.g., approximately 0.333, 0.4, 0.5, 0.625, 0.76, etc.), the ratio of Hf/Lf can range from about 0.1 to about 0.5 (including all values and subranges therebetween, e.g., approximately 0.125, 0.151, 0.175, 0.2, 0.333, 0.375, etc.), the ratio of Hf/(Wf*Lf) can range from about 0.03 to about 0.33 (including all values and subranges therebetween, e.g., approximately 0.05, 0.75, 0.1, 0.15, 0.201, 0.25, etc.), and/or the ratio of Wf/Lf can range from about 0.25 to about 1 (including all values and subranges therebetween, e.g., approximately 0.333, 0.401, 0.625, 0.75, etc.).

Certain exemplary float dimensions (inches), float dimensional ratios, and the pressure differentials (PDs) (inches WC and psi) they can accommodate are presented below.

| Pressure Differential | | Float Dimensions | | | Float Dimensional Ratios | | |
|---|---|---|---|---|---|---|---|
| Inches WC | PSI | Hf | Wf | Lf | Hf/Wf | Hf/Lf | Hf/(Wf * Lf) |
| 0-10 | 0-0.36 | 0.75 | 2 | 3 | 0.375 | 0.25 | 0.125 |
| 0-20 | 0-0.72 | 1 | 2 | 4 | 0.5 | 0.25 | 0.125 |
| 0-40 | 0-1.44 | 1 | 2.75 | 4 | 0.36 | 0.25 | 0.091 |
| 0-100 | 0-3.6 | 1.25 | 4 | 7 | 0.313 | 0.18 | 0.045 |

The overall height (Ht) of the trap can be Hf plus a value ranging from approximately 1 inch to 3 inches (including all values and subranges therebetween, e.g., approximately 1.24, 1.375, 1.51, 1.625, 2, 2.25, 2.5, 2.75, etc.), and/or Ht can be from approximately 2 inches to approximately 6 inches (including all values and subranges therebetween, e.g., approximately 0.75, 1, 1.25, 1.5, 1.875, 2.26, 2.75, 3.51, 4.5001, 5.02, etc. inches). The distance (Lp) from the end of float 1300 to pivot axis P-P can be from approximately 0.05 inches to approximately 1 inch (including all values and subranges therebetween, e.g., approximately 0.124, 0.25, 0.375, 0.51, 0.625, 0.75, 0.875, etc. inches). The perpendicular distance (Lc) from pivot axis P-P to the center axis, centroidal axis, and/or plane (Q-Q) of float chamber port 1244 and/or float valve 1340 can be from approximately 0.5 inches to approximately 6 inches (including all values and subranges therebetween, e.g., approximately 0.75, 1, 1.25, 1.5, 1.875, 2.24, 2.75, 3.5, 4.5, 5.01, etc. inches). Lc can provide a mechanical advantage of from 1.25 to 8 (including all values and subranges therebetween, e.g., approximately 1.5, 1.875, 2.01, 2.25, 2.5, 2.667, 3.24, 3.75, 4.25, 5.5, 7.01, etc.).

Although float chamber port need not necessarily be circular, if circular it can have a diameter (Dp) from approximately 0.05 to 1 inches (including all values and subranges therebetween, e.g., approximately 0.1, 0.14, 0.2, 0.26, 0.375, 0.5, 0.625, 0.761, 0.875, etc. inches).

To create a desired and/or predetermined buoyancy torque, the distance (Lb) from the center of float valve 1340 to the center of buoyancy of float 1300 can be from approximately 1 inch to approximately 3 inches (including all values and subranges therebetween, e.g., approximately 1.25, 1.5, 1.75, 2, 2.25, 2.5, 2.75, etc. inches). The length (Lt) of trap 1100 can be Lf plus a value ranging from approximately 0.5 inch to 2 inches (including all values and subranges therebetween, e.g., approximately 0.74, 1, 1.26, 1.375, 1.51, 1.625, 2, etc. inches).

The buoyant pressure acting on the wetted surface of float 1300 by the water that float 1300 displaces can be modeled as a single resultant force (Fb) (in pounds) acting vertically through the horizontal center of volume and/or the centroid of float 1300. Assuming float 1300 is substantially submerged within the water contained in 1260, Fb reasonably can be approximated as Hf*Wf*Lf*62.4 pounds/cubic foot (density of water)÷1728 cubic inches/cubic foot When float 1300 is totally submerged Fb is at its maximum value and when multiplied by lever arm Lx then a maximum counter-clockwise (when viewed from FIG. 5) torque, Tb, can be produced.

The difference in the pressure created by the gas in float chamber 1240 and the pressure created by the gas in drain compartment 1280 can create a positive differential pressure (PD) in float chamber 1240. That positive differential pressure can be treated as generating a clockwise (when viewed from FIG. 5) pressure torque (or moment) (Tp) that is imposed on float 1300 and/or can be modeled as generating a substantially vertical, substantially downwardly pointing, PD-created force (Fp) that passes through the horizontal center of mass of float 1300. Because PD is applied to any condensate in float chamber 1240 (either directly or via float 1300), PD (coupled with the hydrostatic pressure generated by the weight of condensate at any selected depth of that condensate in float chamber 1240) can be represented as a first vector applying substantially vertically downward along Q-Q. Assuming that the hydrostatic pressure at float chamber port 1244 is negligees with respect to PD due to Hf being rather small, force Fp can be estimated and/or calculated by multiplying the cross-sectional area of float chamber port 1244 by PD. That is, Fp (in pounds) can be reasonably approximated as ((Dp÷2) ^2)*3.14*PD. Force Fp can be modeled as applying orthogonally to, and at a specific orthogonal and/or horizontal first distance (Lc) from, float rotational and/or pivot axis P-P. Force Fp can be modeled as co-axial and/or co-linear with Q-Q.

When sufficient condensate is present in float chamber 1240, that condensate can buoyantly act on float 1300. That buoyant force Fb can be represented as a second, resultant, substantially vertically and/or upwardly pointing, vector that can apply orthogonally to, and at a specific orthogonal and/or horizontal second distance (Lx) from, float rotational and/or pivot axis P-P. Trap 1100 can be configured such that second distance Lx is greater than first distance Lc, thereby, when sufficient condensate is in float chamber 1240, the buoyant torque (or moment) Tb generated by the second force Fb will be greater than the opposing torque Tp generated by the first force Fp, and thus float 1300 will be lifted, such as from the float chamber port 1244. Conversely, when sufficient condensate is not in float chamber 1240, the first vector can generate a greater torque than that (if any) generated by the second vector.

Thus, opposing the torque Tp can be a counter-clockwise (when viewed from FIG. 5) buoyant torque created by the upward buoyant force of float 1300 when lifted by condensate in float chamber 1240. That upward buoyant force can be determined by the dimensions of float 1200. A resultant buoyant force that is equivalent to that upward buoyant force can be treated as applying along X-X, which can pass through a point halfway along the distance from the float rotational and/or pivot axis P-P to the distal edge of float 1200. Thus, the counter-clockwise (when viewed from FIG. 5) buoyant torque Tb generated by the resultant buoyant force can be found by multiplying the resultant buoyant force by the average perpendicular distance at which the resultant buoyant force is applied from the positive float rotational axis.

For example, if float chamber port 1244 is roughly circular and approximately 0.38 inches in diameter, its area is approximately 0.11 square inches. If the differential in pressure between float chamber 1240 and drain compartment 1280 is approximately 8 inches water column (approximately 0.29 psi), then the downward force exerted along the centerline of float chamber port 1244 by that pressure differential is approximately 0.032 pounds. If the perpendicular distance from axis P-P to the centerline of float chamber port 1244 is approximately 0.313 inches, then the torque Tp generated by the downward positive condensate force is approximately 0.0093 inch-pounds in a clockwise (when viewed from FIG. 5) direction.

Continuing with the example, assuming float 1300 has exterior dimensions of approximately 2.12 inches in width, 1.25 inches in height, and 1 inch in depth, the volume of water it displaces when fully submerged is 2.65 cubic inches. Given that water weighs approximately 62.4 pounds per cubic foot, the fully submerged buoyant force on float 1300 is approximately 0.096 pounds. The counter-clockwise (when viewed from FIG. 5) buoyant torque Tb generated by that buoyant force can be treated as occurring at a point along X-X, which can occur halfway between the distal edge of float 1300 and float rotational axis P-P. In this example, the axis P-P is inset 0.25 inches from the proximal edge of float 1300, which has a width of 2.12 inches. Thus, the resultant buoyant force applies at a distance of (2.12÷2) ^0.25 inches, or 0.81 inches from axis P-P, thereby generating a buoyant torque of 0.0775 inch-pounds of torque. Combining these two opposing torques results in a net torque of 0.0675 inch-pounds of counter-clockwise torque, and thus float 1300 will lift off of its seat when it is fully submerged and subject to the specified pressure differential.

Figure 5:
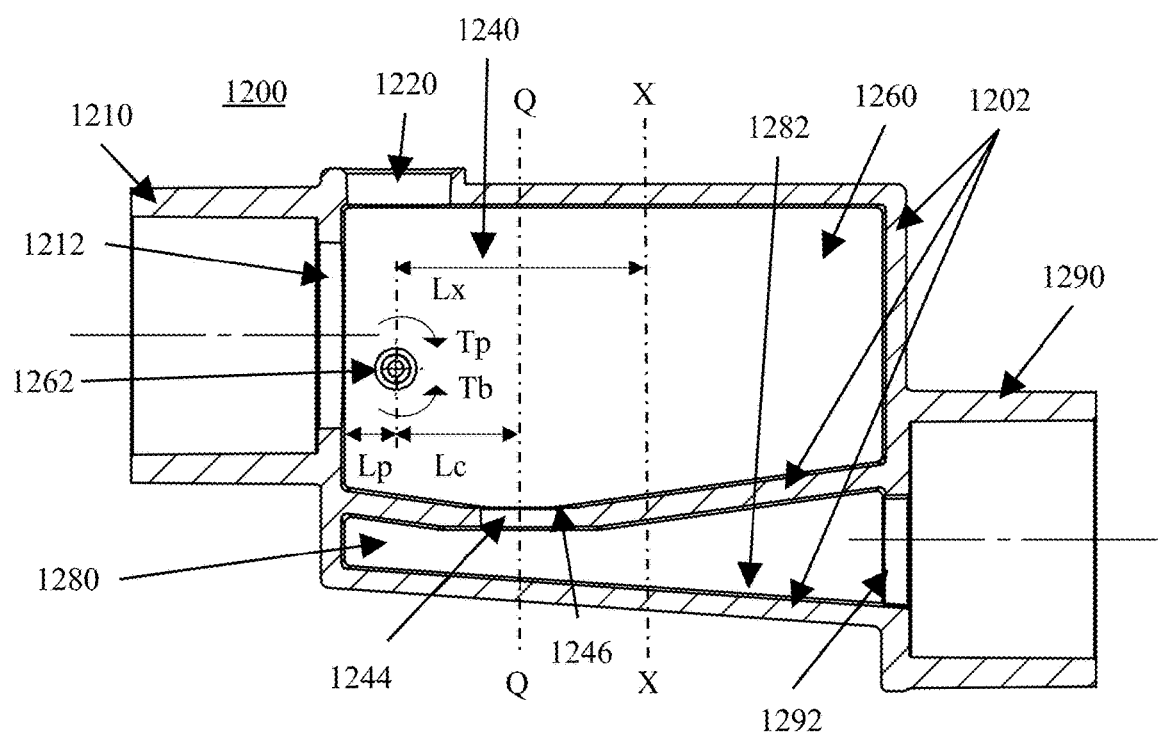
FIG. 5 is a side cross-sectional view, taken at section B-B, of an exemplary embodiment of a housing of a condensate management trap.
Figure 6:
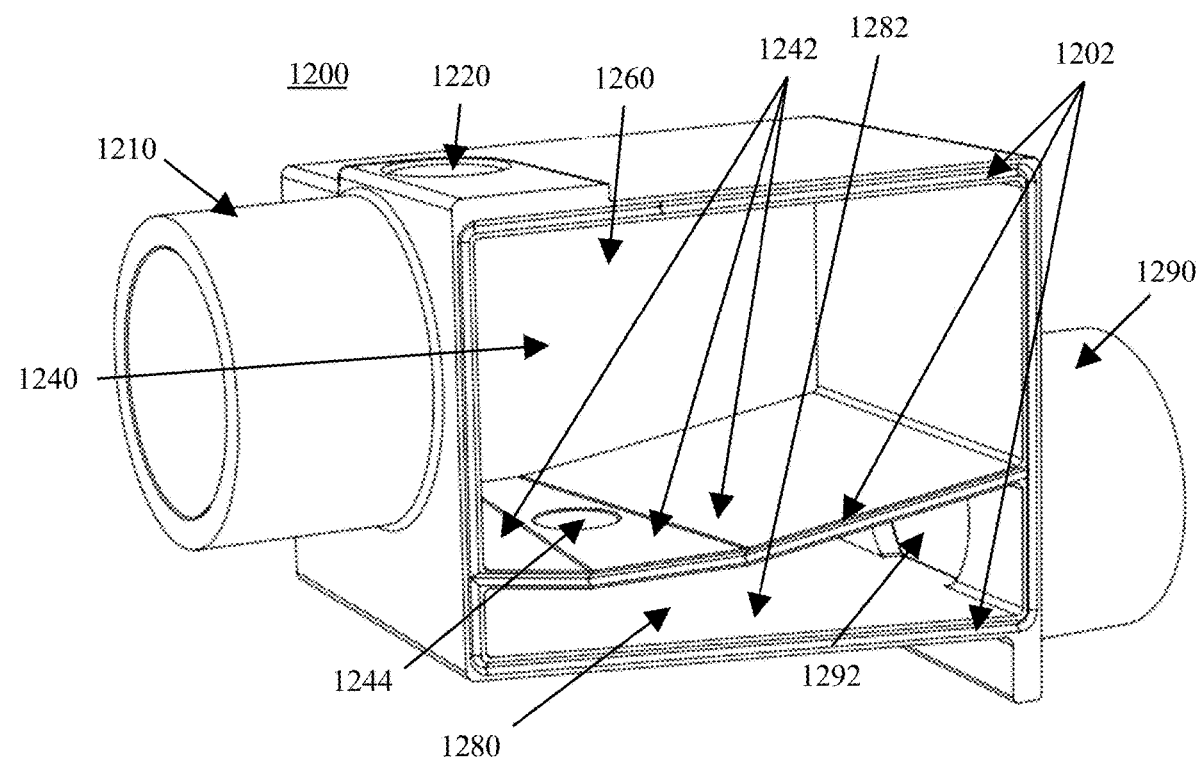
FIG. 6 is a side perspective view of a housing of an exemplary embodiment of a condensate management trap.
Figure 7:
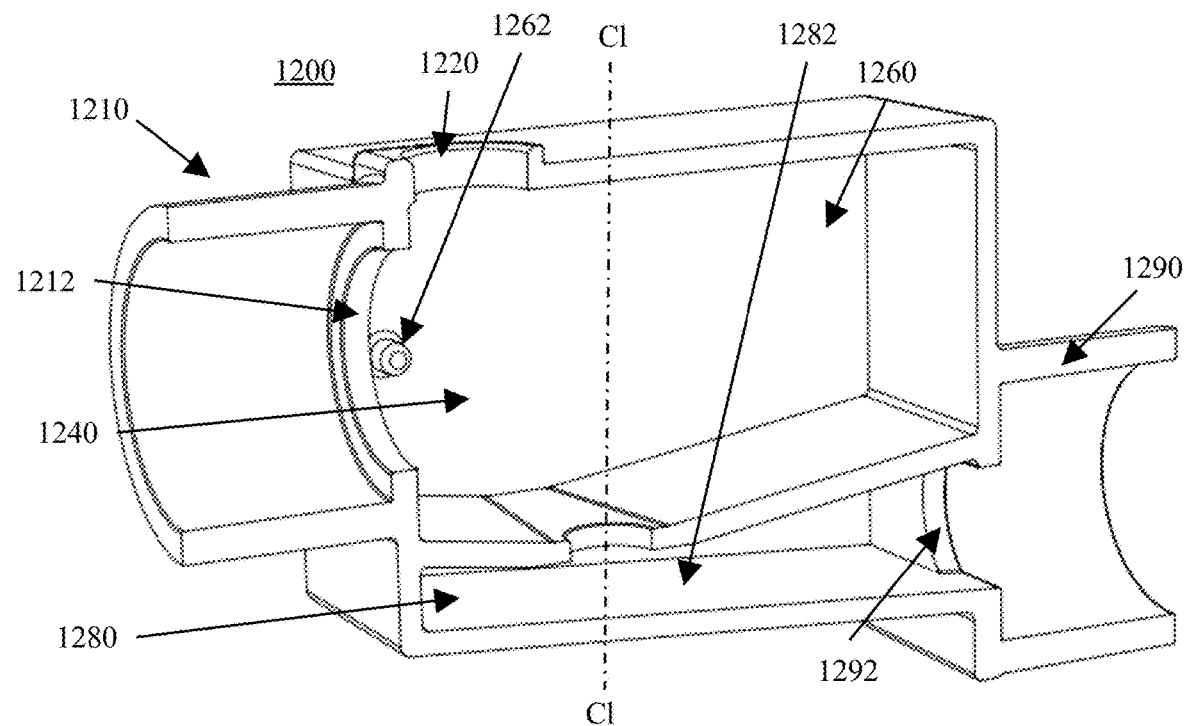
FIG. 7 is a side cross-sectional perspective view, taken at section B-B, of a housing of an exemplary embodiment of a condensate management trap.

Using those approximated forces (Fb and Fp), the buoyant torque (Tb) that can be exerted counter-clockwise (as seen in FIG. 5) about the pivot axis P-P can be approximated as 0.5*(Lf−Lp)*Fb, and the pressure torque (Tp) that can be exerted clockwise (as seen in FIG. 5) about the pivot axis P-P can be approximated as Fp*Lc. Thus, when Tp is greater than Tb, float 1300 will lower and/or float valve 1340 will become substantially seated, and when Tp is less than Tb, float 1300 will rise and/or float valve 1340 will become substantially unseated.

Note that, everything else being equal, the greater the difference between Lf and Lp, the greater Tb. Similarly, everything else being equal, the greater Hf, Lf, and/or Wf, the greater Tb. Thus, if seeking to minimize Hf while accommodating a given PD, then Lf, Wf, and/or Lp and/or Lc can be decreased.

Thus, when little or substantially no condensate is present within float chamber 1240, gravity and/or the force due to PD operating on float 1300 can push float valve 1340 into contact against float valve seat 1246 and/or form an operative fluidic seal between float valve 1340 and float valve seat 1246. Thereby, gravity and/or the force due to PD operating on float valve 1340 can substantially prevent gases from escaping the condensate-producing unit via condensate conduit 1020, such as through float chamber port 1244, into drain compartment 1280, through exit port 1292, out of trap 1100, and/or into drain conduit 1040.

Housing 1200, float 1300, and/or cover 1400 can be formed from a single, blended, and/or composite polymeric material, such as a molded, stamped, machined, and/or 3D-printed plastic material (e.g., polyvinyl chloride (PVC), high density polyethylene (HDPE), acrylonitrile butadiene styrene (ABS), nylon, polypropylene, polycarbonate, reinforced polyethylene terephthalate (PET), polylactic acid (PLA), etc.).

Consistent with the expected condensate load, entrance connector 1210 and/or exit connector 1290 can be sized to accommodate standard nominal pipe sizes, such as ¾ inch, 1 inch, 1.5 inch, 2 inch, etc.

Note that the fit between one or both of float pivot recesses 1360 and one or both of their corresponding protrusions, namely float chamber pivot protrusion 1262 and cover pivot protrusion 1460 can be lose, with a tolerance, "slop", or difference in corresponding, average, and/or maximum cross-sectional dimensions of up to 0.125 inches (including all values and subranges therebetween, e.g., approximately 0.003, 0.00625, 0.01, 0.0125, 0.025, 0.0393, 0.05, 0.075, etc. inches), thereby allowing float valve 1340 to self-adjust as needed to form a relatively good seal against float valve seat 1246, and thereby avoiding the need for extremely tight manufacturing and/or assembly tolerances. Such a configuration allows the pivot axis about which float 1200 pivots to radially shift its position with respect to housing 1200 by a predetermined amount, e.g., up to 0.125 inches, as needed to facilitate alignment between float valve 1340 and float valve seat 1246 to substantially seal float chamber port 1244 and/or substantially prevent condensate flow therethrough.

An upstream condensate-producing unit can be fluidically connected to condensate conduit 1020, which can be fluidically connected to entrance connector 1210, which can be fluidically connected, via entrance port 1212 to float chamber 1240, which can be selectively fluidically connected, via float chamber port 1244, to drain compartment 1280, which can be fluidically connected, via exit port 1292, to exit connector 1290, which can be fluidically connected to a drain conduit 1040.

To assemble trap 1100, the main housing can be laid such that the outer surface of float chamber back wall 1260 is in contact with and/or substantially supported by a substantially level horizontal surface. Float 1300 can be oriented such that a float pivot recess 1360 engages with float chamber pivot protrusion and float valve 1340 is proximal. A cement that is compatible with the materials of housing 1200 and cover 1400 can be applied to housing edge V-groove 1204 and/or cover V-protrusion 1440. Cover pivot protrusion 1460 can be aligned with and encounter the other float pivot recess 1360 as cover V-protrusion 1440 is aligned with and mates with housing edge V-groove 1204.

Pressure (e.g., such as that generated by an approximately 20 pound weight) can be applied to the outer surface of cover 1400 for an appropriate amount of time (e.g., 20 minutes) to allow the cement to set. A clean-out port stopper 1222 and/or plug can be mated with clean-out port 1220. Any unwanted cement can be removed from the exterior of trap 1100. When desired, trap 1100 can be installed between condensate conduit 1020 and drain conduit 1040.

From the above explanation, it can be seen that by the properly choosing the dimensions, locations, and/or spacings for float 1300, axis P-P, and/or float chamber port 1244, condensate management trap 1100 can be configured to accommodate a wide range of differential pressures. Such configurations can allow the net buoyant force to be increased by having the distance of the pressure force from the rotational axis be less than the distance of the buoyant force from the rotational axis. Note that the dimensions of float 1200 can be adjusted to "flatten" float 1200 in a manner that its height is considerable less than its width, thereby allow the total height of condensation management trap 1100 to be fixed at several inches, no matter what the real-world positive pressure of the condensate source. For example, a trap to accommodate 100 inches of water column could be configured to be no more than 5 inches in height (including all values and subranges therebetween, e.g., no more than 1.75, 2, 2.49, 3, 4.01, etc. inches), which can be a considerable savings in the required height of approximately 110 inches for a typical P-trap. More broadly, configurations that can make these features possible can involve any several variables, such as the positive pressure in float chamber 1240, the dimensions of float 1300, distance Lp, distance Lc, distance Lx, and/or the cross-sectional area of float chamber port 1244, etc.

Certain exemplary embodiments can be configured such that there are essentially no pockets, nooks, and/or crannies for debris to accumulate within housing 1200. For example, trap 1100 can be configured such that there is no standing water and/or any debris that arrives in float chamber 1240 will be carried downward and through exit port 1292 with the condensate flow. Float chamber floor 1242 can be sloped toward float chamber port 1244 to encourage discharge of any debris with the condensate, and thereby substantially minimize the potential for debris accumulation near float valve seat 1246 or within float chamber 1240. Similarly, the bottom of drain compartment 1280 can be sloped toward exit port 1292 to encourage discharge of any debris with condensate that flows through exit port 1292, and thereby substantially minimize the potential for debris accumulation near exit port 1292 and/or within drain compartment 1280.

With certain exemplary embodiments, there can be little or substantially no potential for the growth of algae because within trap housing 1200 and/or there can be either only transient water or substantially no water within trap housing 1200, and thus the interior of trap 1100 and its connecting piping can be essentially algae-free.

Thereby, with certain exemplary embodiments, trap 1100 can be configured such that when there is no condensate production there is substantially no standing water in trap housing 1200, and when there is condensate production there is only water (and not gases) that move through trap 1100 and/or into drain conduit 1040.

To further facilitate condensate management, drain compartment 1280 can be configured (e.g., shaped, sloped, etc.) to allow condensate to flow out of the drain compartment 1280 and into drain conduit 1040, thereby eliminating the opportunity for condensate management trap 1100 to freeze.

Note that any subset of components of condensate management trap 1100 can be integrated in a manner that they can be only destructively separated and/or can be non-destructively releasably joined. For example, cover 1400 can be attached to housing edge 1202 and/or to housing 1200, such as by cementing, gluing, caulking, solvent welding, laser welding, ultrasonic welding, mechanically connecting, screwing, clipping, buckling, tying, force-fitting, wedging, and/or taping. Condensate management trap 1100 can be, e.g., glued, solvent welded, friction fit, and/or threaded into condensate conduit 1020 and/or drain conduit 1040.

Any portion or component of trap 1100 can be formed by extrusion, casting, transfer molding, blow-molding, injection-molding, thermosetting, thermoforming, stamping, coating, depositing, curing, vacuum forming, milling, machining, cutting, etching, lithographic printing, joining, 3-D printing, and/or additive manufacturing, etc. Unless described otherwise, any portions or components of trap 1100 described herein as coupled can be connected via threading, friction fitting, solvent welding, laser welding, gluing, caulking, soldering, brazing, compression fitting, and/or integration (i.e., formed as a single component), etc. Any portion or component of trap 1100 can have any level of opacity, where a low level of opacity for housing 1200 can allow condensate and/or debris within trap 1100 to be observed, while a high level of opacity can hide them. Discussions herein of pressure are described with respect to ambient atmospheric pressure (e.g., approximately 14.7 psia at sea level).

Thus, certain exemplary embodiments can provide a condensate management trap 1100 that is configured to operate dry when the condensate-producing unit is not operating, and when the condensate-producing unit is operating to allow condensate to flow from the points of condensate generation within the unit, without substantial impediment through trap 1100, and to a drain, while simultaneously not allowing a substantial quantity of gases to flow through trap 1100.

Certain exemplary embodiments can be dimensioned such that the vertical and/or rotational travel of float 1300, and thus float valve 1340, is constrained by the height of housing 1200. That is, contact of float 1300 with float chamber top wall 1264 can prevent float 1300 from rotating, from the seated position, more than a predetermined rotational angle Ar, which can range from approximately 3 degree to approximately 15 degrees (including all values and subranges therebetween, e.g., approximately 4, 4.875, 6.01, 7, 8.666, 10, 12.5, 14.027 etc. degrees).

For example, when float valve 1340 is in a seated, closed position, the height of the gap (Hr) between the top of float 1300 and the inside surface of the top of housing 1200 can be, e.g., 0.5 inches, while the length (Lr=Lf−Lp) of the portion of float 1300 that rotates upward can be, e.g., 10 inches. Based on those exemplary dimensions, float 1300 can rotate upward (counterclockwise in FIGS. 20 and 21) to an angle Ar of only approximately 3 degrees (=arctan (0.5÷10)) before it contacts and is rotationally constrained by the top of float housing 1200.

Such a rotational constraint can ensure that the flow of condensate across float valve seat 1246 and into float chamber port 1244 is at a sufficiently high velocity that debris resting on float chamber floor 1242 and/or float valve seat 1246 is entrained in that flow, thereby preventing accumulation of such debris to a level that it prevents float valve 1340 from properly seating in and/or on float valve seat 1246.

Certain exemplary embodiments can be configured in a manner that float proximal wall 1322 is positioned, shaped, and/or dimensioned to avoid and/or withstand erosion due to debris entrained in condensate entering float chamber 1240 via entrance port 1212. For example, float proximal wall 1322 can be thicker than other walls of float body 1320.

As another example, float proximal wall can be bowed inwards to provide more clearance for condensate entering float chamber 1230 via entrance port 1212 to flow toward float chamber port 1244 without contacting (and thereby potentially applying an erosive force onto) float proximal wall 1322.

Certain exemplary embodiments can be configured such that one or more of float chamber walls 1260, 1266, 1268, and/or float chamber floor 1242 are contoured to encourage a swirling flow of condensate toward float chamber port 1244. Such a flow pattern can help to prevent any debris entrained in condensate flowing through entrance port does not accumulate on float chamber floor 1242, but instead is swept by the swirling motion of the condensate flow toward and through float chamber port 1244.

Certain exemplary embodiments can be configured in a manner that float proximal wall 1322 is positioned and/or shaped such that condensate entering float chamber 1240 through entrance port 1212 continually or at least occasionally impacts float proximal wall 1322. Given the looseness in fit between float pivot recesses 1360 and their corresponding pivot protrusions, such an impact can cause float 1300 to move, reciprocate, and/or vibrate and/or can cause float valve 1340 to move, reciprocate, and/or vibrate on float valve seat 1246. Such motions can potentially dislodge debris located on or in float valve seat 1246, thereby allowing for the achievement of a better seating and/or sealing of float valve 1340 against float valve seat 1246.

Certain exemplary embodiments can provide a device configured to release condensate from a condensate-producing unit toward a drain, comprising:
 a float;
 a housing defining:
  a float chamber configured to substantially contain the float;
  a float chamber port configured to direct condensate received from the float chamber into a drain compartment; and/or
  an exit port configured to direct condensate received from the drain compartment into a drain conduit; and/or
 a cover configured to permanently seal the housing and to provide a pivot point for the float;
 wherein:
  the float is configured to pivot within the housing and about a pivot axis,
  the float defines a float height that, when substantially no condensate is in the float chamber, extends substantially perpendicular to the pivot axis, a float width that extends substantially parallel to the pivot axis, and a float length that extends substantially perpendicular to the pivot axis;
  the float length and the float height define a front float face and a back float face, the float length and the float width define a top float face and a bottom float face, and the float height and the float width define, with respect to the front float face, a left float face and a right float face;
  the float is configured to allow condensate to flow out of the float chamber through the float chamber port and substantially prevent gas from flowing out of the float chamber via the float chamber port;
  a first distance measured horizontally from the pivot axis and orthogonally intersecting a first vector representing a downward force created by the gas acting on the float is less than a second distance measured horizontally from the pivot axis and orthogonally intersecting a second vector representing an upward force caused by condensate in the float chamber buoyantly acting on the float;
  rotational movement of the float about the pivot axis is constrained by the housing to no more than 15 degrees;
  rotational movement of the float about the pivot axis is constrained by the housing to no more than 10 degrees;
  a ratio of the float height to the product of the float width and the float length is no greater than 0.15;

the pivot axis is configured to radially shift position, with respect to the housing, during rotation of the float by 0.01 inches to 0.05 inches. the first vector is coaxial with a central axis of the float chamber port;

float is configured to operably form a fluidic seal with a stationary and substantially smooth first port seat defined adjacent the float chamber port, the seal formed when substantially no condensate is present within the float chamber;

the housing is configured to substantially deter condensate from remaining in the float chamber when condensate is not flowing into the float chamber;

the housing is configured to operably deter debris from accumulating in the float chamber when condensate is flowing through the float chamber port;

the housing is unitary;

the float left face is substantially thicker than the float right face;

the float left face is configured to substantially avoid contact between the float and condensate entering the float chamber;

one or more walls of the housing are configured to impart a swirling flow of condensate toward the float chamber port; and/or the float valve is configured to be vibrated by condensate impacting the float left face while the float valve is seated adjacent the float chamber port;

the float valve is configured to be totally submerged in condensate when counter-clockwise rotation is at its maximum as a result of float coming into contact with bottom surface of upper housing and inlet drain pipe is completely filled with condensate, which can results in a maximum positive pressure capability and maximum condensate flow at this pressure.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
about—around and/or approximately.
above—at a higher level.
accumulate—to amass, collect, gather and/or become gathered together in an increasing quantity.
across—from one side to another.
activity—an action, act, step, and/or process or portion thereof.
adapt—to design, make, set up, arrange, shape, configure, and/or make suitable and/or fit for a specific purpose, function, use, and/or situation.
adapter—a device used to effect operative compatibility between different parts of one or more pieces of an apparatus or system.
adjacent—close to; lying near; next to; adjoining, and/or within a horizontal radius of approximately 0 to approximately 0.25 inches of, including all values and subranges therebetween.
after—following in time and/or subsequent to.
against—in contact with so as to rest and/or press on, so as to come into forcible contact with, and/or contrary to and/or in a direction and/or course opposite to.
air—the earth's atmospheric gas.
allow—to provide, let do, happen, and/or permit.
along—through, on, beside, over, in line with, and/or parallel to the length and/or direction of; and/or from one end to the other of
amount—a quantity.
an—at least one.
and—in conjunction with.
and/or—either in conjunction with or in alternative to.
annular—shaped like a ring.
any—one, some, every, and/or all without specification.
apparatus—an appliance or device for a particular purpose.
approximately—about and/or nearly the same as.
are—to exist.
around—about, surrounding, and/or on substantially all sides of; and/or approximately.
as long as—if and/or since.
associate—to join, connect together, and/or relate.
at—in, on, and/or near.
at least—not less than, and possibly more than.
atmospheric pressure—the pressure exerted by the earth's atmosphere at any given point, being the product of the mass of the atmospheric column of the unit area above the given point and of the gravitational acceleration at the given point; typically approximately 14.7 psia.
attach—to fasten, secure, couple, and/or join.
attached—joined or secured together.
avoid—to resist and/or try to prevent from happening.
away—on a path directed from a predetermined location.
axis—a straight line about which a body and/or geometric object rotates and/or can be conceived to rotate and/or a center line to which parts of a structure and/or body can be referred.
back—that portion and/or side that is opposite and/or behind the front.
ball—a substantially spherical object.
based on—indicating one or more factors that affect a determination, but not necessarily foreclosing additional factors that might affect that determination.
below—beneath; in a lower place; and/or less than.
between—in a separating interval and/or intermediate to.
bias—n. a tension and/or force; v. to urge and/or force.
block—(n) an obstacle and/or the act of blocking; (v) to obstruct, stop and/or or impede the passage of and/or movement through; obstruct, and/or to prevent from happening, succeeding, and/or progressing.
body—a main and/or central part.
bottom—opposite of top and/or a lowest part of an object relative to a point of reference, the object in a predetermined orientation relative to the point of reference.
buoyancy—the ability to float in a liquid and/or to rise in a fluid; and/or the upward force that a fluid exerts on an object less dense than itself that is at least partly immersed in the fluid.
buoyant—having and/or marked by buoyancy.
by—via and/or with the use and/or help of
can—is capable of, in at least some embodiments.
cause—to bring about, provoke, precipitate, produce, elicit, be the reason for, result in, and/or effect.
cease—to halt and/or stop.
center of mass—the average position of all the parts of an object or system, weighted according to their masses and/or the unique position at which the weighted position vectors of all the parts of the object or system sum up to zero.

central—situated at, in, or near the center of a length.

centroid—the "centroid" or geometric center of a plane figure is the arithmetic mean position of all the points in the figure. The "centroid" of a ring or a bowl, for example, lies in the object's central void.

chamber—a space and/or compartment that is substantially or at least partially defined and surrounded by one or more objects.

chamber-facing—having a surface that defines, is in contact with, and/or is adjacent to a chamber.

circular—having a cross-section of a circle and/or substantially resembling a round shape.

clean-out—an access for inspecting, reaching, and/or removing obstructions, debris, and/or contaminants; and/or a pipe fitting containing a removable plug that provides access for inspection and/or cleaning of the pipe run.

closable—able to be repeatedly closed.

close—to alter and/or move an object so that an opening and/or or passage is covered and/or obstructed by the object; to shut; and/or to draw and/or bind together.

coaxial—having and/or mounted on a common axis.

collect—to gather, accumulate, and/or bring together in a group or mass.

collection—an accumulation and/or the act or process of collecting.

combustion—the chemical action resulting from the direct combination of oxygen gas, generally in air, with a combustible material accompanied by the evolution of heat and light.

composition of matter—a combination, reaction product, compound, mixture, formulation, material, and/or composite formed by a human and/or automation from two or more substances and/or elements.

comprising—including but not limited to, what follows.

conceive—to imagine, conceptualize, form, and/or develop in the mind.

condensate—water, an aqueous solution, and/or a liquid, that liquid resulting from condensation of a gas.

condensate producing unit—a machine, assembly, apparatus, and/or system that produces condensate. Examples include furnaces, air conditioners, heat pumps, chillers, ice-makers, and dehumidifiers.

conduit—a tube, pipe, channel, and/or duct.

configure—to design, arrange, set up, shape, and/or make suitable and/or fit for a specific purpose, function, use, and/or situation.

configured to—having a structure that, during operation, will perform the indicated activity(ies). To the extent relevant to the current application, the use of "configured to" is expressly not intended to invoke 35 U.S.C. § 112(f) for that structure.

connect—to join or fasten together.

constrain—to confine, limit, inhibit and/or keep within certain limits.

contact—to physically touch and/or come together.

contain—to store, restrain, hold, and/or keep within limits.

containment—the act of containing, keeping from spreading, and/or directing the flow, motion, and/or spread of.

convert—to transform, adapt, and/or change.

convex—having a surface and/or boundary that curves and/or bulges outward, as the exterior of a sphere; and/or a surface such that for any pair of points on the surface, any point on the straight line segment that joins the pair of points is under the object.

convey—to transmit, transport, guide, and/or carry.

corresponding—related, associated, accompanying, similar in purpose and/or position, conforming in every respect, and/or equivalent and/or agreeing in amount, quantity, magnitude, quality, and/or degree.

coupleable—capable of being joined, connected, and/or linked together.

coupling—linking in some fashion.

cover—(n) a substantially planar object configured to protect and/or conceal; (v) to overlay, place upon and/or over.

create—to bring into being.

debris—a solid substance and/or the remains of something destroyed, disintegrated, and/or decayed.

define—to establish the meaning, relationship, outline, form, and/or structure of and/or to precisely and/or distinctly describe and/or specify.

degrees—a unit of angular measure equal in magnitude to $1/360$ of a complete revolution in a predetermined plane.

derive—to receive, obtain, and/or produce from a source and/or origin.

deter—to hamper, hinder, delay, interrupt, interfere, oppose, restrict, retard, impede, stop, and/or prevent from doing, acting, happening, and/or progressing.

determine—to find out, obtain, calculate, decide, deduce, ascertain, and/or come to a decision, typically by investigation, reasoning, and/or calculation.

device—a machine, manufacture, and/or collection thereof difference—a value obtained via a subtraction of a first quantity from a second quantity.

direct—to point, aim, control, cause, provide instruction to, send toward a place and/or object, and/or cause to move in or follow a predetermined course.

direction—a spatial relation between something and a course along which it points and/or moves; a distance independent relationship between two points in space that specifies the position of either with respect to the other; and/or a relationship by which the alignment and/or orientation of any position with respect to any other position is established.

disconnect—to unattach and/or sever a connection.

distance—a measure of physical and/or logical separation.

downward—directed toward a lower place and/or position.

drain—(n) a pipe and/or channel that carries off water, liquid, slurry, waste, sewage, etc.; (v) to empty, cause liquid to go out from, draw off (a liquid) by a gradual process, and/or become empty by the drawing off of liquid.

during—at some time in a time interval.

each—every one of a group considered individually.

effective—sufficient to bring about, provoke, elicit, and/or cause.

ellipsoid—a geometric surface, all of whose plane sections are ellipses (note that a circle is a special case of an ellipse); and/or a solid having such a shape.

elongated—drawn out, made spatially longer, and/or having more length than width.

embodiment—an implementation, manifestation, and/or concrete representation.

enter—to come and/or flow into.

estimate—(n) a calculated value approximating an actual value; (v) to calculate and/or determine approximately and/or tentatively.

exemplary—serving as an example, instance, and/or illustration.

exit—(n) a path, passage, and/or way leading through an opening and away from an interior of a container; (v) to leave, go away, and/or flow out of.

extend—to move out and/or away from; to exist and/or be locate, placed, and/or stretched lengthwise.

exterior—a region that is outside of a device and/or system.

extrude—to shape (a plastic, for instance) by forcing it through a die.

first—a label for a referenced element in one or more patent claims, but that label does not necessarily imply any type of ordering to how that element (or any other elements of a similar type) is implemented in embodiments of the claimed subject matter.

float—(n) a buoyant object; (v) to cause to and/or to remain suspended within and/or on the surface of a fluid without sinking.

flow—(n) the act of flowing, a continuous transfer, and/or a stream and/or current; (v) to pour forth, issue in a stream, and/or move and/or run smoothly with unbroken continuity, as in the manner characteristic of a fluid.

flowrate—a measure how much flows over a given time period.

fluid—a liquid, slurry, vapor, mist, cloud, plume, and/or foam, etc.

fluidic—of, relating to, or characteristic of a fluid.

for—with a purpose of force—a capacity to do work and/or cause physical change; a dynamic influence that changes a body from a state of rest to one of motion or changes its rate of motion, where the magnitude of the force is equal to the product of the mass of the body and its acceleration; and/or a static influence that produces an elastic strain in a body or system or bears weight.

form—(v) to construct, build, generate, and/or create; (n) a phase, structure, and/or appearance.

fourth—a label for an element in one or more patent claims, the element other than a "first" or "second" or "third" referenced element of a similar type, but the label does not necessarily imply any type of ordering to how that "fourth" element is implemented in embodiments of the claimed subject matter.

from—used to indicate a source, origin, and/or location thereof.

front—that portion and/or side that is forward, prominent, and/or most often seen and/or used.

function—to perform as designed when applied.

furnace—a chamber, enclosure, or other holding means for heating materials therein.

further—in addition.

gas—a substance in a gaseous state, that is, in a state of matter distinguished from the solid and liquid states by relatively low density and viscosity, relatively great expansion and contraction with changes in pressure and temperature, the ability to diffuse readily, and the spontaneous tendency to become distributed uniformly throughout any container.

generate—to create, produce, give rise to, and/or bring into existence.

given— greater—larger and/or more than.

guide—to direct, steer, and/or exert control and/or influence over; and/or a passive structure configured to direct, resist, and/or prevent the movement of something.

having—including but not limited to.

height—a measurement of the extent of something along an, often substantially vertical, dimension.

horizontal—parallel to and/or in the plane of the horizon.

housing—something that covers, encloses, protects, holds, and/or supports, such as a frame, box, and/or chassis.

including—including but not limited to.

initialize—to prepare something for use and/or some future event.

inner—closer than another to the center and/or middle.

install—to connect or set in position and prepare for use.

integral—formed and/or united into another entity.

intersecting—meeting at a point and/or cutting across and/or through.

into—toward, in the direction of, and/or to the inside of.

is—to exist in actuality.

left—opposite of right and/or of and/or designating the side of something and/or someone that faces west when the front is turned towards the north.

length—a longest dimension of something and/or the measurement of the extent of something along its greatest dimension.

less than—having a measurably smaller magnitude and/or degree as compared to something else.

level—a relative position on a scale and/or a position along a vertical axis indicating height and/or depth.

located—situated approximately in a particular spot and/or position.

longitudinal axis—a straight line defined parallel to an object's length and passing through a centroid of the object.

lower—in a position below something else and/or lesser in elevation in relation to something else.

mating—one of a matched pair.

may—is allowed and/or permitted to, in at least some embodiments.

measured—determined, as a dimension, quantification, and/or capacity, etc. by observation.

method—one or more acts that are performed upon subject matter to be transformed to a different state or thing and/or are tied to a particular apparatus, said one or more acts not a fundamental principal and not preempting all uses of a fundamental principal.

more—a quantifier meaning greater in size, amount, extent, and/or degree.

movement—a change in place and/or position from one location to another.

near—a distance of less than approximately [X].

negative—less than zero and/or at a pressure less than atmospheric.

no—an absence of and/or lacking any.

non-destructively—of, relating to, or being a process that does not result in damage to the subject material and/or product and/or results in such minimal damage that the subject material and/or product can be re-used for its intended purpose.

not—a negation of something.

one—being and/or amounting to a single unit, individual, and/or entire thing, item, and/or object.

open—(v) to interrupt, to release from a closed and/or fastened position, to remove obstructions from, to clear, and/or to electrically decouple in a manner to create a gap across which electrical energy cannot readily flow; (adj) not substantially obstructed and/or not closed.

openable—able to be opened.

opening—an open space serving as an aperture, passage, or gap.

operable—practicable and/or fit, ready, and/or configured to be put into its intended use and/or service.

operably—when operating and/or in effect for its intended use and/or service.

operating—in its intended use and/or service.

operative—when in operation for its intended use and/or service.

or—a conjunction used to indicate alternatives, typically appearing only before the last item in a group of alternative items.

orient—to position a first object relative to a second object.

orthogonal—perpendicular and/or at a right angle to.

other—a different and/or distinct entity and/or not the same as already mentioned and/or implied.

out—in a direction away from the inside, center, and/or middle, such as a container and/or source.

outside—beyond a range, boundary, and/or limit; and/or not within.

overall—total, combined, and/or cumulative effect.

parallel—of, relating to, and/or designating lines, curves, planes, and/or surfaces everywhere equidistant.

part—a component.

passes—runs and/or extends.

per—for each and/or by means of.

permanently—lasting and/or remaining without essential change in status, condition, and/or place.

perpendicular—intersecting at or forming substantially right angles; and/or substantially at a right angle with respect to an axis; and/or of, relating to, or designating two or more straight coplanar lines or planes that intersect at approximately a right angle.

pipe—a hollow cylinder and/or tube used to conduct a liquid, gas, and/or finely divided solid.

pivot—(v) to rotate, revolve, and/or turn; (n) the act of turning on a pivot and/or a short rod or shaft on which a related part rotates and/or or swings.

plurality—the state of being plural and/or more than one.

point—(n.) a defined physical and/or logical location in at least a two-dimensional system and/or an element in a geometrically described set and/or a measurement or representation of a measurement having a time coordinate and a non-time coordinate. (v.) to indicate a position and/or direction of.

port—an opening for the insertion and/or passage of an object and/or fluid.

portion—a part, component, section, percentage, ratio, and/or quantity that is less than a larger whole.

positive—greater than zero and/or at a pressure greater than atmospheric.

pre-—a prefix that precedes an activity that has occurred beforehand and/or in advance.

predetermine—to determine, decide, and/or establish in advance.

present—existing.

pressure—a measure of force applied uniformly over a surface.

prevent—to impede, resist, hinder, avert, deter, stop, and/or keep from happening.

prior—before and/or preceding in time or order.

probability—a quantitative representation of a likelihood of an occurrence.

product—something produced by human and/or mechanical effort.

project—to calculate, estimate, or predict.

provide—to furnish, supply, give, and/or make available.

radially—radiating from or converging to a common center and/or having or characterized by parts so arranged or so radiating.

rail—a guide, running surface, bar, and/or member configured for supporting and/or guiding another thing.

range—a measure of an extent of a set of values and/or an amount and/or extent of variation.

ratio—a relationship between two quantities expressed as a quotient of one divided by the other.

receive—to gather, take, acquire, obtain, accept, get, and/or have bestowed upon.

recommend—to suggest, praise, commend, and/or endorse.

reduce—to make and/or become lesser and/or smaller.

relative—considered with reference to and/or in comparison to something else.

release—to let go and/or free from something that restrains, binds, fastens, and/or holds back.

remain—to continue to be in the same place; to stay or stay behind; and/or to be left after the removal, loss, passage, or destruction of other.

remove—to eliminate, remove, and/or delete, and/or to move from a place or position occupied.

repeat—to do again and/or perform again.

repeatedly—again and again; repetitively.

request—to express a desire for and/or ask for.

result—(n.) an outcome and/or consequence of a particular action, operation, and/or course; (v.) to cause an outcome and/or consequence of a particular action, operation, and/or course.

retain—to restrain, keep, and/or hold.

right—opposite of left and/or of and/or designating the side of something and/or someone that faces east when the front is turned towards the north.

rightward—toward the right.

ring—a substantially toroidal object which can be imagined as having been generated by rotating a closed loop (e.g., ellipse, circle, irregular curve, polygon, etc.) about a fixed line external to the loop.

rotational—about and/or around an axis.

said—when used in a system or device claim, an article indicating a subsequent claim term that has been previously introduced.

seal—(v.) to shut close; to keep close; to make fast; to keep secure; to prevent leakage; (n.) a device configured to shut close; to keep close; to make fast; to keep secure; and/or to prevent leakage.

seat—(n) a sealing, supporting, and/or mating surface; (v) to attach to, seal against, support with, and/or bring firmly into contact with.

second—a label for an element in one or more patent claims, the element other than a "first" referenced element of a similar type, but the label does not necessarily imply any type of ordering to how that "second" element or the "first" element is implemented in embodiments of the claimed subject matter.

segment—all co-linear points located between and including two points.

select—to make a choice or selection from alternatives.

set—a related plurality.

shape—a characteristic surface, outline, and/or contour of an entity.

shift—to re-direct, move, and/or transfer.

slope—(v) to position at an angle and/or incline with respect to vertical or horizontal; (n) an inclined line, surface, plane, position, and/or direction; and/or with respect to a first point and a second point that are intersected by a straight line, a ratio of the change in the ordinal value from the first point to the second point, to the change in the abscissal value from the first point to the second point; and/or a measure of a degree of inclination; and/or a rate of change.

smooth—lacking substantial surface irregularities, roughness, and/or projections.

source—a point and/or thing at or from which something originates, springs into being, and/or from which it derives and/or is obtained.

species—a class of individuals and/or objects grouped by virtue of their common attributes and assigned a common name; a division subordinate to a genus.

spherical—having the shape of, or substantially resembling, a sphere.

stationary—substantially fixed with respect to an object of reference.

stop—(n) a device and/or means that obstructs, blocks, deters, and/or plugs up; (v) to interrupt, cease and/or end, and/or to block and/or prevent the flow or passage of store—to place, hold, and/or retain data, typically in a memory.

stream—a flow of water and/or other fluid substantially—to a considerable, large, and/or great, but not necessarily whole and/or entire, extent and/or degree.

such that—in a manner that results in.

sufficient—a degree and/or amount necessary to achieve a predetermined result.

support—to bear the weight of, especially from below.

surface—an outer boundary of a body, object, and/or thing and/or any material layer and/or face constituting and/or resembling such a boundary.

swirling—a whirling and/or eddying motion and/or mass system—a collection of mechanisms, devices, machines, articles of manufacture, processes, data, and/or instructions, the collection designed to perform one or more specific functions.

that—used as the subject or object of a relative clause.

therein—within.

thickness—a quantitative measure of a dimension associated with an object.

third—a label for an element in one or more patent claims, the element other than a "first" or "second" referenced element of a similar type, but the label does not necessarily imply any type of ordering to how that "third" element is implemented in embodiments of the claimed subject matter.

through—across, among, between, and/or in one side and out the opposite and/or another side of to—a preposition adapted for use for expressing purpose.

toward—used to indicate a destination and/or in a physical and/or logical direction of.

transform—to change in measurable: form, appearance, nature, and/or character.

transmit—to send as a signal, provide, furnish, and/or supply.

trap—a device configured for sealing a passage against the escape of gases.

treatment—an act, manner, or method of handling and/or dealing with someone and/or something.

two—a cardinal number equal to one plus one.

unitary—whole, not separated, and/or having the nature of a unit.

upon—immediately or very soon after; and/or on the occasion of.

upper—in a high position relative to something else.

upward—toward and/or facing up and/or a top.

use—to put into service.

valve—a device that regulates flow through a pipe and/or through an aperture by opening, closing, and/or obstructing a port and/or passageway.

vector—an expression characterized by a magnitude and a direction.

vertical—substantially perpendicular to horizontal.

via—by way of, with, and/or utilizing.

vibrate—to move back and forth or to and fro, especially rhythmically and/or rapidly.

volume—a mass and/or a three-dimensional region that an object and/or substance occupies.

wall—a partition, structure, and/or mass that serves to enclose, divide, separate, segregate, define, and/or protect a volume.

weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

when—at a time and/or during the time at which.

wherein—in regard to which; and; and/or in addition to.

while—for as long as, during the time that, and/or at the same time that.

width—a measurement of the extent of something along an, often substantially horizontal, dimension.

with—accompanied by.

with regard to—about, regarding, relative to, and/or in relation to.

with respect to—about, regarding, relative to, and/or in relation to.

within—inside the limits of.

without—not accompanied by.

zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential"; and within, among, and between any described embodiments:

any two or more described substances can be mixed, combined, reacted, separated, and/or segregated;

any described characteristic, function, activity, substance, component, and/or structural element, or any combination thereof, can be specifically included, duplicated, excluded, combined, reordered, reconfigured, integrated, and/or segregated;

any described interrelationship, sequence, and/or dependence between any described characteristics, functions, activities, substances, components, and/or structural elements can be omitted, changed, varied, and/or reordered;

any described activity can be performed manually, semi-automatically, and/or automatically;

any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112(f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. A device configured to release condensate from a condensate-producing unit toward a drain, comprising:
    a float that defines a float body and a float valve that protrudes from the float body; and
    a housing defining:
        a float chamber configured to substantially contain the float;
        a float chamber port configured to direct condensate received from the float chamber into a drain compartment; and
        an exit port configured to direct condensate received from the drain compartment into a drain conduit;

wherein:
the float is configured to pivot within the housing and about a pivot axis;
the float defines a float height that, when substantially no condensate is in the float chamber, extends substantially perpendicular to the pivot axis, a float width that extends substantially parallel to the pivot axis, and a float length that extends substantially perpendicular to the pivot axis;
the float length and the float height define a front float face and a back float face, the float length and the float width define a top float face and a bottom float face, and the float height and the float width define, with respect to the front float face, a left float face and a right float face;
the float is configured to allow condensate to flow out of the float chamber through the float chamber port and substantially prevent gas from flowing out of the float chamber via the float chamber port;
a first distance measured horizontally from the pivot axis and orthogonally intersecting a first vector corresponding to a downward force created by the gas acting on the float is less than a second distance measured horizontally from the pivot axis and orthogonally intersecting a second vector representing an upward force caused by condensate in the float chamber buoyantly acting on the float; and
rotational movement of the float about the pivot axis is constrained by the housing to no more than 15 degrees.

2. The device of claim 1, wherein:
the rotational movement of the float about the pivot axis is constrained by the housing to no more than 10 degrees.

3. The device of claim 1, wherein:
a ratio of the float height to the product of the float width and the float length is no greater than 0.15.

4. The device of claim 1, wherein:
the pivot axis is configured to radially shift position, with respect to the housing, during rotation of the float by 0.01 inches to 0.05 inches.

5. The device of claim 1, wherein:
the first vector is coaxial with a central axis of the float chamber port.

6. The device of claim 1, wherein:
the float is configured to operably form a fluidic seal with a stationary and substantially smooth first port seat defined adjacent the float chamber port, the seal formed when substantially no condensate is present within the float chamber.

7. The device of claim 1, wherein:
the housing is configured to substantially deter condensate from remaining in the float chamber when condensate is not flowing into the float chamber.

8. The device of claim 1, wherein:
the housing is configured to operably deter debris from accumulating in the float chamber when condensate is flowing through the float chamber port.

9. The device of claim 1, wherein:
the housing is unitary.

10. The device of claim 1, wherein:
the float left face is substantially thicker than the float right face.

11. The device of claim 1, wherein:
the float left face is configured to substantially avoid contact between the float and condensate entering the float chamber.

12. The device of claim 1, wherein:
one or more walls of the housing are configured to cause a swirling flow of condensate toward the float chamber port.

13. The device of claim 1, further comprising:
a cover configured to permanently seal the housing and to provide a pivot point for the float.

14. The device of claim 1, wherein:
the housing is configured to prevent standing condensate from remaining in the drain compartment for more than 20 minutes after condensate flow into the float chamber ceases.

15. The device of claim 1, wherein:
the float valve is configured to be vibrated by condensate contacting a float left face while the float valve is seated adjacent the float chamber port.

16. A condensate management system comprising the device of claim 1.

17. A system comprising the condensate-producing unit of claim 1 connected to the device of claim 1.

18. A system comprising the condensate-producing unit of claim 1, wherein the condensate-producing unit comprises the device of claim 1.

* * * * *